US009458358B2

(12) United States Patent
De Boer et al.

(10) Patent No.: US 9,458,358 B2
(45) Date of Patent: Oct. 4, 2016

(54) ARTICLE, COMPOSITIONS, SYSTEMS, AND METHODS USING SELECTIVELY DETACKIFIED ADHESIVES

(71) Applicant: Avery Dennison Corporation, Glendale, CA (US)

(72) Inventors: Robert H. De Boer, Zuid Holland (NL); Ronald Haycox, Painesville, OH (US); Pavel Janko, Haarlem (NL); Dave Whitman, State College, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/585,365

(22) Filed: Dec. 30, 2014

(65) Prior Publication Data

US 2015/0191633 A1 Jul. 9, 2015

Related U.S. Application Data

(60) Provisional application No. 61/924,900, filed on Jan. 8, 2014, provisional application No. 62/063,131, filed on Oct. 13, 2014.

(51) Int. Cl.
*C09J 7/02* (2006.01)
*C09J 7/00* (2006.01)
*C09J 133/08* (2006.01)
(Continued)

(52) U.S. Cl.
CPC ............ *C09J 7/0225* (2013.01); *C08F 265/06* (2013.01); *C09J 5/00* (2013.01); *C09J 7/0207* (2013.01); *C09J 151/003* (2013.01); *C09J 151/06* (2013.01); *G21K 5/02* (2013.01); *C09J 2203/334* (2013.01); *C09J 2205/31* (2013.01); *C09J 2451/00* (2013.01); *Y10T 428/1476* (2015.01)

(58) Field of Classification Search
USPC .................. 250/365, 372, 461.1, 492.1, 526; 526/86, 317.1; 428/48.1, 36.91, 42.8, 428/42.3, 343, 355, 543; 427/487, 508, 427/558; 383/211, 210, 210.1; 493/264, 493/331; 522/1, 103, 184; 24/114.6, 304, 24/448, 449; 206/813
See application file for complete search history.

(56) References Cited

U.S. PATENT DOCUMENTS

| 4,513,039 A | 4/1985 | Esmay |
| 4,830,910 A * | 5/1989 | Larson ................. C08G 65/007 427/385.5 |

(Continued)

FOREIGN PATENT DOCUMENTS

| DE | 3122633 | 6/1981 |
| EP | 1234865 | 8/2002 |

(Continued)

OTHER PUBLICATIONS

International Search Report and Written Opinion dated Apr. 8, 2015 issued in corresponding International Application No. PCT/US2014/072640.

*Primary Examiner* — Bernard Souw
(74) *Attorney, Agent, or Firm* — Avery Dennison Corporation

(57) ABSTRACT

Adhesive compositions are described which can be selectively detackified or deadened. Articles using such adhesive compositions are also described. Also described are techniques in which select regions of adhesive layers in the articles are detackified. Also described are systems and methods using the various articles and adhesive compositions. And particular label constructions are described.

31 Claims, 14 Drawing Sheets

(51) Int. Cl.

| | | |
|---|---|---|
| *G09F 3/10* | (2006.01) | |
| *B05D 5/10* | (2006.01) | |
| *B32B 7/12* | (2006.01) | |
| *C09J 151/00* | (2006.01) | |
| *C09J 5/00* | (2006.01) | |
| *G21K 5/02* | (2006.01) | |
| *C09J 151/06* | (2006.01) | |
| *C08F 265/06* | (2006.01) | |

(56) References Cited

U.S. PATENT DOCUMENTS

| | | | |
|---|---|---|---|
| 4,873,140 A * | 10/1989 | McIntyre | C08J 7/047 |
| | | | 428/343 |
| 5,306,744 A | 4/1994 | Wolfersberger et al. | |
| 5,346,766 A * | 9/1994 | Otter | C08G 63/08 |
| | | | 428/343 |
| 5,476,565 A | 12/1995 | Akada et al. | |
| 5,702,127 A | 12/1997 | Korondi, Jr. | |
| 6,174,578 B1 | 1/2001 | Holley | |
| 6,461,728 B2 | 10/2002 | Weiss et al. | |
| 6,685,228 B2 * | 2/2004 | Riley | G09F 3/0288 |
| | | | 283/101 |
| 6,783,850 B2 | 8/2004 | Takizawa et al. | |
| 7,473,454 B2 | 1/2009 | Vertanen | |
| 7,510,764 B2 | 3/2009 | Husemann et al. | |
| 7,858,709 B2 | 12/2010 | Takahasi et al. | |
| 8,252,425 B2 | 8/2012 | Lee et al. | |
| 8,377,535 B2 * | 2/2013 | Nakagawa | C09J 7/0228 |
| | | | 428/141 |
| 8,389,596 B2 * | 3/2013 | Boyce | B65D 75/5805 |
| | | | 522/103 |
| 8,763,890 B2 * | 7/2014 | Clark | B32B 3/085 |
| | | | 206/813 |
| 8,875,356 B2 * | 11/2014 | Zerfas | A44B 18/0007 |
| | | | 24/114.6 |
| 9,096,780 B2 * | 8/2015 | Zerfas | B32B 3/085 |
| 2001/0026907 A1 | 10/2001 | Husemann et al. | |
| 2003/0108738 A1 | 6/2003 | Alahapperuma et al. | |
| 2003/0198773 A1 * | 10/2003 | Miekka | C09J 7/0203 |
| | | | 428/41.8 |
| 2004/0106693 A1 | 6/2004 | Kauffman et al. | |
| 2004/0206446 A1 | 10/2004 | Charley | |
| 2006/0078703 A1 | 4/2006 | Virtanen | |
| 2009/0116111 A1 | 5/2009 | Toyama | |
| 2012/0177307 A1 * | 7/2012 | Duan | B32B 27/00 |
| | | | 383/211 |
| 2012/0258271 A1 * | 10/2012 | Maughan | C09J 7/0207 |
| | | | 428/40.1 |
| 2013/0048221 A1 * | 2/2013 | Blackwell | C09J 7/0246 |
| | | | 156/703 |
| 2013/0178554 A1 * | 7/2013 | Boyce | B65D 75/5805 |
| | | | 522/170 |
| 2014/0069587 A1 * | 3/2014 | Rackovan | B32B 43/006 |
| | | | 156/703 |
| 2014/0250641 A1 * | 9/2014 | Zerfas | A44B 18/007 |
| | | | 24/449 |

FOREIGN PATENT DOCUMENTS

| | | |
|---|---|---|
| EP | 2743324 | 6/2014 |
| EP | 2545132 | 11/2015 |
| EP | 2970725 | 1/2016 |
| WO | 2012/123814 | 9/2012 |
| WO | 2015/157350 | 10/2015 |

* cited by examiner

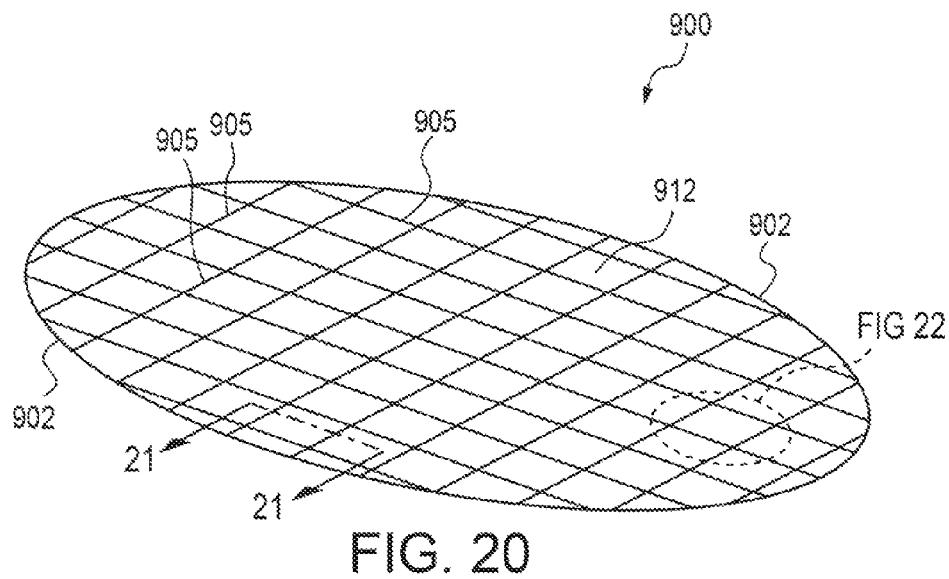
FIG. 20
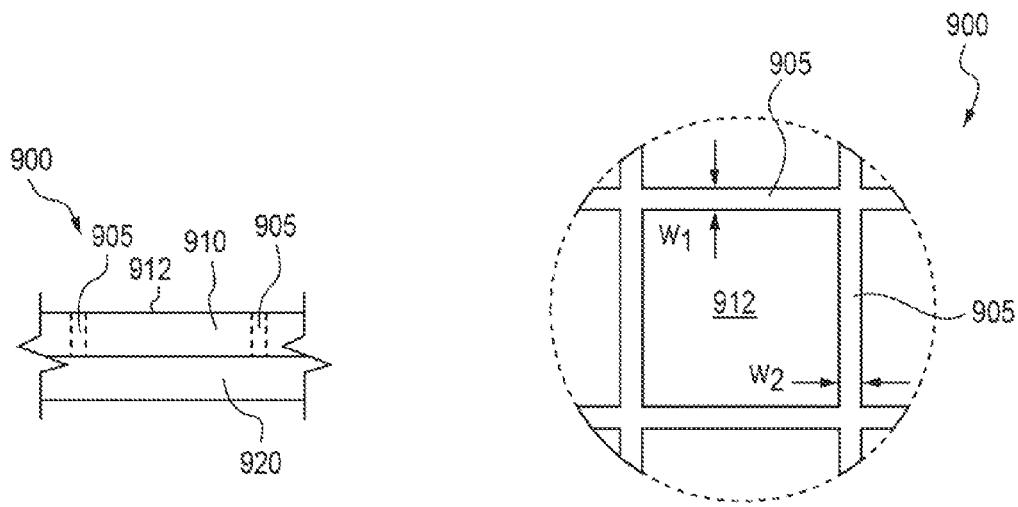
FIG. 21
FIG. 22

ARTICLE, COMPOSITIONS, SYSTEMS, AND METHODS USING SELECTIVELY DETACKIFIED ADHESIVES

REFERENCE TO RELATED APPLICATIONS

This applications claims priority to U.S. Provisional Patent Application Ser. No. 61/924,900, entitled Articles, Compositions, Systems, and Methods Using Selectively Detackified Adhesives, filed on Jan. 8, 2014, and to U.S. Provisional Patent Application Ser. No. 62/063,131, entitled Articles, Compositions, Systems, and Methods Using Selectively Detackified Adhesives, filed on Oct. 13, 2014, both of which are incorporated herein by reference in their entireties.

FIELD

The present subject matter relates to techniques for detackifying an adhesive. These techniques and associated aspects can be used in a wide range of applications including selectively deadening a region of adhesive. The present subject matter also provides various processing equipment to perform the adhesive deadening. In addition, the present subject matter provides specific adhesive compositions and articles containing the adhesive compositions.

BACKGROUND

A wide range of applications and uses are known for relatively thin labels or laminates. Such "ultra thin" constructions as known in the industry offer several benefits including improved aesthetics and lower material cost as a result of a reduction in thickness of one or more film layers.

However, processing such ultra thin laminates can lead to a variety of processing difficulties. For example, such thin constructions may result in die cutting issues and difficulties in maintaining die strike lines. Furthermore, such thin constructions typically exhibit less tensile strength and thus may tear or fracture.

Besides processing ultra thin constructions, processing difficulties may also arise when die cutting labels or other laminates. Typically, labels are formed from a continuous sheet of adhesive backed facestock. Labels are formed by die cutting the facestock into desired label shapes. After die cutting, the portion of the facestock not used for labels (typically referred to as "matrix") is removed. Upon such removal, edge regions of the labels (typically referred to as "label rims" or "rims") are then exposed. A processing issue that can arise after die cutting adhesive backed facestock or other adhesive-containing laminates, e.g., labels, is "bleeding." Bleeding is a phenomenon in which adhesive flows outward from under a region of the cut facestock, laminate, or label around the periphery or rim of the cut article. The adhesive then typically contacts other processing surfaces and can lead to a host of problems.

Accordingly, a need exists for a strategy to avoid or at least reduce the potential of these various problems when processing labels, laminates and the like; and particularly for thin constructions.

SUMMARY

The difficulties and drawbacks associated with previously known practices and technologies are addressed in the present articles, adhesive compositions, systems, and methods.

In one aspect, the present subject matter provides a layered assembly comprising a face layer, a release layer, and a layer of adhesive disposed between the face layer and the release layer. Upon sufficient exposure to radiant energy, the exposed adhesive undergoes a reduction in tack. At least one of the face layer and the release layer is at least substantially transparent to an extent such that upon the exposure to radiant energy, the at least one of the face layer and the release layer permit radiant energy to pass therethrough to the adhesive.

In another aspect, the present subject matter provides an adhesive composition which upon sufficient exposure to radiant energy undergoes a reduction in tack. The composition comprises an effective amount of functionalized emulsion polymer.

In still another aspect, the present subject matter also provides a method for selectively reducing tack of an adhesive within a layered assembly. The method comprises providing a layered assembly including (i) a face layer, (ii) a release layer, and (iii) a layer of adhesive disposed between the face layer and the release layer. The adhesive has a characteristic such that upon sufficient exposure to radiant energy, the exposed adhesive undergoes a reduction in tack. At least one of the face layer and the release layer is substantially transparent to the radiant energy. The method also comprises irradiating the layered assembly with the radiant energy such that the radiant energy passes through at least one of the face layer and the release layer to the adhesive layer. The irradiated adhesive undergoes a reduction in tack.

In still another aspect, the present subject matter provides a system for selectively reducing tack of an adhesive within a layered assembly. The system comprises a layered assembly. The layered assembly includes (i) at least one of a face layer and a release layer which is at least substantially transparent, and (ii) a layer of adhesive disposed adjacent to the at least one face layer and the release layer. The adhesive layer has a characteristic such that upon sufficient exposure to radiant energy, the exposed adhesive undergoes a reduction in tack. The system also comprises a source of radiant energy. The radiant energy is able to reduce tack of the adhesive in the layered assembly.

In yet another aspect, the present subject matter provides a method for allowing relatively thin labels to be used in a label dispensing operation in which a release liner is separated from an adhesive face of the label and the label is applied to an article to be labeled. The method comprises prior to separating the release liner from the adhesive and label, irradiating at least a portion of the adhesive with radiant energy, whereby the irradiated adhesive undergoes a reduction in tack and a reduced peel force is obtained upon separating the release liner from the adhesive and label.

In still a further aspect, the present subject matter provides a layered adhesive assembly comprising a face layer, a substrate, and an adhesive layer disposed between the face layer and the substrate. The adhesive undergoes a reduction in tack upon sufficient exposure to radiant energy. The adhesive layer includes a first zone of reduced adhesion, a second zone of deadened adhesion, and a third zone of non-reduced or non-deadened adhesion.

In yet another aspect, the present subject matter provides a layered adhesive assembly comprising a substrate, and an adhesive layer disposed on the substrate. The adhesive undergoes a reduction in tack upon sufficient exposure to radiant energy. The adhesive assembly defines an edge extending around the assembly and the adhesive layer includes at least one zone of reduced or deadened adhesion, and another zone of non-reduced or non-deadened adhesion. The zone of reduced or deadened adhesion is at least partially located between and exclusively between the zone of non-reduced or non-deadened adhesion and the edge.

In still a further aspect, the present subject matter provides a method of promoting adhesion between an adhesive article and a surface of interest and reducing occurrence of air bubbles along an interface between the adhesive article and the surface of interest. The method comprises providing an adhesive article including a substrate and an adhesive layer disposed on the substrate. The adhesive article defines an edge extending around the article. The adhesive undergoes a reduction in tack upon sufficient exposure to radiant energy. The method also comprises defining a first zone within the adhesive layer of the article along at least a portion of the edge. The method additionally comprises defining a second zone within the adhesive layer of the article spaced from the edge and located such that the first zone is exclusively between the edge and the second zone. And, the method also comprises irradiating the first zone of adhesive with radiant energy, whereby the irradiated adhesive undergoes a reduction in tack.

In yet another aspect, the present subject matter provides a method of facilitating removal of an adhesive article from a surface to which the article is adhered. The adhesive article includes a substrate and an adhesive layer disposed on the substrate. The adhesive article defines an edge extending around the article. The adhesive undergoes a reduction in tack upon sufficient exposure to radiant energy. The method comprises defining a first zone within the adhesive layer of the article along at least a portion of the edge. The method also comprises defining a second zone within the adhesive layer of the article spaced from the edge. And, the method additionally comprises irradiating the first zone of adhesive with radiant energy, whereby the irradiated adhesive undergoes a reduction in tack.

In yet another aspect, the present subject matter provides a method of producing an adhesive assembly having at least one region of reduced adhesion. The method comprises providing an adhesive assembly comprising a facestock layer, an adhesive layer, and a release liner. The adhesive layer is disposed between the facestock layer and the release liner. The adhesive undergoes a reduction in tack upon sufficient exposure to radiant energy. The method also comprises separating the release liner from the adhesive assembly to thereby expose the adhesive layer. The method additionally comprises irradiating at least a portion of the adhesive layer to thereby produce at least one region of reduced adhesion. And, the method also comprises recombining the previously separated release liner with the adhesive face of the irradiated adhesive layer, to thereby produce the adhesive assembly.

In still another aspect, the present subject matter provides a layered adhesive assembly comprising a face layer defining an outer edge, and an adhesive layer disposed on the face layer. The adhesive undergoes a reduction in tack upon sufficient exposure to radiant energy. The adhesive layer defines one or more regions of deadened adhesive providing air egress. The one or more regions of deadened adhesive extend in a grid pattern in the adhesive layer. The one or more regions of deadened adhesive extend to the outer edge of the face layer.

In yet another aspect, the present subject matter provides a method of reducing occurrence of air bubbles along an interface between an adhesive label and a container. The method comprises providing an adhesive label including a face layer defining an outer edge and an adhesive layer disposed on the face layer. The adhesive undergoes a reduction in tack upon sufficient exposure to radiant energy. The adhesive layer defines one or more regions of deadened adhesive providing air egress. The one or more regions of deadened adhesive extend to the outer edge of the face layer. The method also comprises applying the adhesive label to a container by contacting the adhesive layer to the container, whereby air bubbles between the adhesive layer and the container are displaced along the regions of deadened adhesive toward the outer edge of the face layer.

In still another aspect, the present subject matter provides a layered adhesive assembly comprising a face layer defining an outer edge, and an adhesive layer disposed on the face layer. The adhesive undergoes a reduction in tack upon sufficient exposure to radiant energy. The adhesive layer defines one or more regions of deadened adhesive adjacent to at least a portion of the outer edge.

In yet another aspect, the present subject matter provides a labeled container comprising a container defining an outer surface, and a layered adhesive assembly disposed on and contacting the outer surface of the container. The layered adhesive assembly includes a face layer defining an outer edge and an adhesive layer disposed between the face layer and the outer surface of the container. The adhesive undergoes a reduction in tack upon sufficient exposure to radiant energy. The adhesive layer defines one or more regions of deadened adhesive adjacent to at least a portion of the outer edge.

In still another aspect, the present subject matter provides a layered adhesive assembly comprising a face layer defining a plurality of panels and an outer edge and at least one fold line separating adjacent panels. The adhesive assembly also comprises an adhesive layer disposed on the face layer. The adhesive undergoes a reduction in tack upon sufficient exposure to radiant energy. The adhesive layer defines one or more regions of deadened adhesive. At least one of the panels includes a region of deadened adhesive.

In yet another aspect, the present subject matter provides a labeled container comprising a container defining an outer surface, and a layered adhesive assembly disposed on and contacting the outer surface of the container. The layered adhesive assembly includes a face layer defining an outer edge and at least one fold line separating adjacent panels, and an adhesive layer. At least a portion of the adhesive layer is disposed between at least one panel of the face layer and the outer surface of the container. The adhesive undergoes a reduction in tack upon sufficient exposure to radiant energy. The adhesive layer defines one or more regions of deadened adhesive.

In still a further aspect, the present subject matter provides a layered adhesive assembly comprising a substrate and an adhesive layer disposed on the substrate. The adhesive undergoes a reduction in tack upon sufficient exposure to radiant energy. The adhesive assembly defines an edge extending around the assembly and the adhesive layer includes at least one zone of fully deadened adhesion, at least one zone of non-reduced or non-deadened adhesion, and at least one zone of partially reduced adhesion.

In yet another aspect, the present subject matter provides a container defining an outer surface, and a layered adhesive assembly including a substrate and an adhesive layer disposed on the substrate. The adhesive undergoes a reduction in tack upon sufficient exposure to radiant energy. The adhesive assembly defines an edge extending around the assembly and the adhesive layer includes at least one zone of fully deadened adhesion, at least one zone of non-reduced or non-deadened adhesion, and at least one zone of partially reduced adhesion.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 20 is a perspective view of a label having a plurality of air egress channels formed along an adhesive face of the label in accordance with an embodiment of the present subject matter.

FIG. 21 is a partial schematic view illustrating a portion of the label of FIG. 20.

FIG. 22 is a detailed schematic view of a portion of the adhesive face of the label of FIG. 20.

DETAILED DESCRIPTION OF THE EMBODIMENTS

Figure 1:
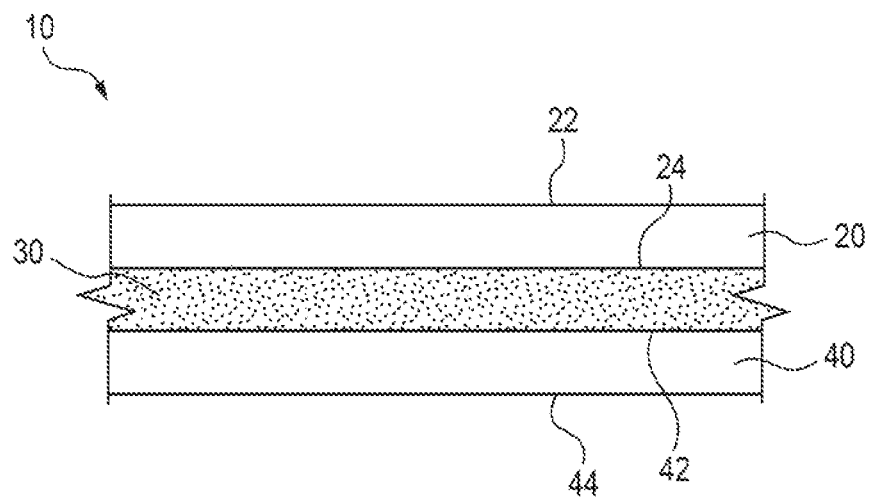
FIG. 1 is a schematic cross sectional view of an embodiment of a layered assembly in accordance with the present subject matter.

The present subject matter relates to techniques of detackifying or at least partially deadening an adhesive layer using radiant energy such as UV light and/or electron beam (periodically referred to as "ebeam" energy). In certain embodiments, a layer of UV-sensitive adhesive is exposed to UV light for a certain time period to thereby detackify the adhesive. This technique can be used in a wide range of applications including selectively deadening a region of adhesive such as along a matrix stripping region. Doing so reduces the amount of delamination or separation force, between adjoining regions of a layered assembly, labels or other laminates, and thereby enables the use of thinner materials (among other advantages). The selected regions of adhesive layer(s) can be detackified by directing UV light through either or both of a face layer or a liner layer of a layered assembly. The present subject matter also includes directing radiant energy to exposed edge regions of a laminate or multilayer assembly. The present subject matter also provides various processing equipment to perform the adhesive deadening, such as a roller with a UV light included in the roller. Other equipment, methods, and applications are also contemplated pursuant to the present subject matter. The present subject matter also provides specific adhesive compositions that are sensitive to radiant energy and particularly UV-sensitive adhesive compositions. The adhesives can use certain functionalized polymers as described herein to provide a UV-sensitive emulsion pressure sensitive adhesive (PSA). Sources of UV light include high pressure, medium pressure, and low pressure mercury lamps, optionally doped with additives to adjust the emission spectrum, and LEDs emitting in the range 200-400 nm. Other sources of UV light are also suitable.

Articles

The articles of the present subject matter comprise one or more layers such as a substrate layer that defines a face, and one or more layers or regions of an adhesive that is sensitive to radiant energy as described herein. The term "sensitive to radiant energy" or "UV-sensitive" or other like term(s) refers to the adhesive having characteristics such that upon exposure to certain forms of radiant energy such as UV light for example, the adhesive undergoes a reduction in tack level, as typically evidenced as a reduction in its loop tack value. These aspects are described in greater detail herein.

In describing the extent of exposure to radiant energy, the term "dose" can be used. "Dose" refers to the total amount of applied energy. For ultraviolet light, the units are of the form "energy per area," for example, $mJ/cm^2$ or $kJ/m^2$. In electron beam curing, dose is also a measure of applied energy, but it is traditionally measured on a mass basis: J/kg, which is called a "Gray," with abbreviation Gy. In either case, dose is an important parameter. The dose is a function of the intensity of the UV or ebeam source, the relative transparency of any intervening materials, and how long the sample is exposed to the source. Higher intensity, higher transparency or longer time means a higher dose. In many applications, the adhesive is moved past a fixed energy source, so that the speed of motion determines the time under the source. In these cases faster speed corresponds to lower dose. If dose is held constant, the intensity of the energy source and the corresponding time needed to apply the dose matters, but this is a minor effect to that of the overall dose. Typically the dose is applied all at once by passing under a single energy source or in rapid succession by a series of energy sources under which the same passes, with the total exposure time measured in seconds or fractions of seconds. However, as long as the intensity during each exposure is above a certain threshold, in principal the dose can be applied in multiple exposures separated by minutes or even hours.

UV exposure doses can be measured using a dosimeter such as the UV Power Puck II from EIT LLC. The sensor of the dosimeter must be covered with a sample of the at least partially transparent layer to properly measure the UV dose actually delivered to the adhesive layer. When measured in this manner preferred doses are at least 500 $mj/cm^2$ in a UV wavelength range appropriate to the one or more photoinitiators. More preferred are at least 250 $mj/cm^2$ and most preferred are at least 150 $mj/cm^2$.

In certain embodiments, the present subject matter provides layered assemblies comprising a face layer or other substrate, a release liner or "liner" layer, and a layer of radiant energy sensitive adhesive disposed between the face layer and the liner layer. FIG. 1 schematically depicts a layered assembly 10 comprising a face layer 20, a layer of radiant energy sensitive adhesive 30, and a liner layer 40. The face layer 20 defines oppositely directed faces 22 and 24. And the liner layer 40 defines oppositely directed faces 42 and 44. It will be understood that the layered assemblies of the present subject matter including a layered assembly 10 may also include one or more additional layers or other components not shown in FIG. 1.

In many embodiments and as described in greater detail herein, one or more layers for example two layers, in a layered assembly which are disposed immediately adjacent to the adhesive layer or region are at least partially transparent to the passage of radiant energy. For example, referring to the layered assembly 10 depicted in FIG. 1, one or both of the face layer 20 and the liner 40 are at least partially transparent such that the layer(s) allow UV light to pass through the respective layer(s) to the adhesive. The extent of transmittance of the UV light is such that the adhesive undergoes a reduction in tack level. These aspects are described in greater detail herein.

Figure 2:
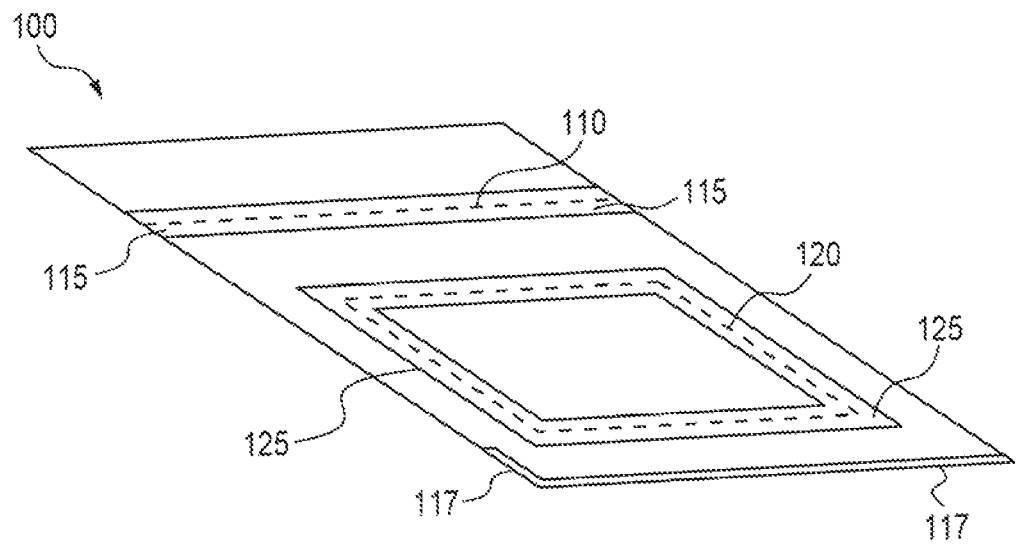
FIG. 2 is a schematic perspective view of another embodiment of a layered assembly in accordance with the present subject matter.

FIG. 2 is a schematic perspective view of another layered assembly in accordance with the present subject matter. The layered assembly 100 comprises a face layer, a liner layer, and a layer of a radiant energy sensitive adhesive disposed between the face layer and the liner layer. The present subject matter provides strategies for selectively detackifying one or more regions of adhesive by selectively exposing only those regions to the radiant energy of interest. For example, referring to FIG. 2, the layered assembly 100 may include one or more regions at which it is desirable to detackify or at least partially deaden the adhesive in those regions and in only those regions. For example, the layered assembly 100 can include a perforation line 110. In certain applications it may be desirable to detackify or at least partially deaden the adhesive in a region 115 generally encompassing the line 110. In another example, the layered assembly 100 can include a die cut or kiss cut line 120 that extends through a face layer. A region 125 of detackified or deadened adhesive can be readily provided that encompasses the line 120. This practice can be used to prevent or at least reduce the potential for adhesive "bleeding" along "rims" or cut edges. It will be understood that the present subject matter includes a wide array of different configurations of layered assemblies having one or more regions or areas of detackified or at least partially deadened adhesive, and is not limited in any manner to the particular embodiments described herein or shown such as in FIG. 2. Furthermore, in many embodiments, the adhesive region(s) or layer(s) to be detackified are located within the interior of a layered assembly and thus are bounded by other layers such as a face layer and a liner. However, the present subject matter also includes selectively detackifying adhesive region(s) or area(s) that are exposed and not covered by one or more layers. In addition, the present subject matter also includes selectively detackifying edge regions of the adhesives. For example, referring to FIG. 2, in certain applications it may be desirable to detackify or at least partially deaden an edge region 117 of the layered assembly 100. This strategy may prevent or reduce adhesive bleeding.

The various articles and layered assemblies of the present subject matter comprise (i) one or more layers of a material that is sufficiently transparent to permit the passage of select radiant energy therethrough, and (ii) one or more layers of a radiant energy sensitive adhesive as described herein in greater detail.

A wide array of materials can be used for the transparent or substantially transparent material. Nonlimiting examples of light transmissive polymeric film materials include for example cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, cyclic olefin copolymers, polyethylene naphthalate, and copolymers or blends based on naphthalene dicarboxylic acids. Optionally, the film can contain suitable mixtures or combinations of these materials. In certain embodiments, a transparent face film of polyethylene terephthalate (PET) or biaxially oriented polypropylene (BOPP) is used. In certain embodiments, it contemplated that glassine paper may be used. Glassine is sufficiently transparent to be used as a transparent backing material and in certain situations offers advantages over PET. An example of a glassine material is FASSON BG40 liner commercially available from Avery Dennison.

The layer through which the radiant energy passes must have at least some transparency to the radiant energy. For materials or layers having relatively low transparency, a more intense energy source, longer exposure time, and/or slower line speed, or combinations thereof could be utilized. For example, if a layer under review only transmitted 50% of the radiant energy, that deficiency could be compensated for by doubling the intensity of the energy source, or reducing the line speed by a factor of 2, or by a combination of these techniques.

Provided at least one layer in the various articles and layered assemblies of the present subject matter is sufficiently transparent, other layers may optionally be substantially opaque. Non-limiting examples of substantially opaque layers would include papers, inks, paints, and pigments, cavitated films such as cavitated BOPP, metallic coatings and foils, and paper or polymer films with dispersed fillers or pigments.

Radiant Energy Sensitive Compositions

The present subject matter provides adhesive compositions that upon exposure to certain forms of radiant energy, undergo a reduction in tack. In many embodiments the adhesive compositions are UV-sensitive adhesives and undergo a reduction in tack upon exposure to UV radiation. The present subject matter includes adhesive compositions that undergo reductions in tack upon exposure to other forms of radiant energy such as electron beam. In particular embodiments, the present subject matter provides emulsion pressure sensitive adhesive compositions which have properties that can be selectively adjusted after drying and film formation. As described herein, typically such adjustment is performed by exposure to radiation such as UV light or from an electron beam. In many embodiments of the present subject matter, the reduction in tack is accomplished by free-radical polymerization which crosslinks the polymer. This increases the gel content which has the effect of reducing tack.

The adhesive compositions generally comprise emulsion particles. The polymers of the present subject matter are prepared by treating an emulsion polymer which includes carboxylic acid functional monomers with an ethylenically unsaturated monomer including an epoxy group in the presence of a suitable catalyst.

Other methods of introducing ethylenic unsaturation into an emulsion particle are contemplated. For example, an ethylenically unsaturated isocyanate or ethylenically unsaturated anhydride in the presence of a suitable catalyst could be used to treat an emulsion polymer which includes hydroxyl functional monomers. Alternatively, a suitable catalyst could be used to transesterify a (meth)acrylic monomer with a vinyl alcohol or vinyl ester containing polymer. Other methods on introducing ehylenic unsaturation into an emulsion particle known to those of skill in the art are also contemplated in conjunction with the present invention.

Suitable emulsion polymers can be prepared via many different processes by one skilled in the art, such as emulsion polymerization, multistage emulsion polymerization, miniemulsion polymerization, or dispersion of an existing polymer in water.

Emulsions suitable for the present subject matter may have particle sizes from 50 nm to 1000 nm. In certain embodiments, the particle sizes are from 75 to 700 nm. And, in still other embodiments, the particle sizes are from 200 to 500 nm.

Emulsions suitable for the present subject matter should exhibit pressure sensitive adhesive behavior at the intended use temperature prior to cure. Pressure sensitive adhesives are generally defined as materials which exhibit permanent tack at the intended use temperature. Pressure sensitive adhesives originate from a film forming, elastomeric material which combines a high level of tack with an ability to quickly wet the surface to which it is applied. Pressure sensitive adhesives provide fast bonding at low to moderate pressure as a result of their flow characteristics. Pressure sensitive adhesives also exhibit sufficient cohesion and elasticity so that they can be handled and removed from smooth surfaces without leaving any residue.

Suitable polymers for the present subject matter will have glass transition temperatures which result in pressure sensitive adhesive behavior at the intended application temperature. It is well known in the art to control glass transition temperature by for example monomer selection, and/or proportions of monomers in copolymers.

Suitable carboxylic acid monomers for the present subject matter include acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate and acryloxyethyl acid phthalate. Combinations of carboxylic acid monomers may be used. Suitable amounts of carboxylic acid monomers range from 1 to 20 percent based on total monomer. In certain embodiments, the amount of carboxylic acid monomers is within a range of from 2 to 12 percent. In particular embodiments, the amount of carboxylic acid monomers is within a range of from 3 to 10 percent. Also contemplated are monomers which may be converted to contain carboxylic acid groups, such as anhydride monomers such as maleic anhydride or readily hydrolyzed ester containing monomers such as methyl acrylate.

Ethylenically unsaturated monomers containing epoxy groups suitable for the present subject matter include glycidyl methacrylate, glycidyl acrylate, acrylated epoxidized soybean oil, allyl glycidyl ether and 3,4-epoxycyclohexyl methyl methacrylate. Combinations of epoxy functional monomers may be used. Suitable amounts range from 0.1 to 2 equivalents of epoxy to each equivalent of carboxylic acid monomer. In particular embodiments, the amount of epoxy functional monomers is from 0.2 to 1.5 equivalents. In still other embodiments, the amount of epoxy functional monomers is from 0.5 to 1 equivalents.

Suitable catalysts include tetrabutyl ammonium hydroxide, methyl tributyl ammonium hydroxide, ammonium hydroxide, tetrabutyl ammonium chloride, methyltributyl ammonium chloride, triphenyl phosphine and chromium acetate. Other catalysts suitable for reacting epoxies and carboxylic acids may also be used, and combinations of catalysts may be used.

It may be desirable to add an inhibitor to prevent polymerization of the ethylenically unsaturated epoxy functional monomer or premature cure of the resulting functionalized latex. Suitable inhibitors include hydroquinone, methoxyhydroquinone, butylated hydroxy toluene, phenothiazine, TEMPO and 4-hydroxy TEMPO (also known as "4HT"). Combinations of inhibitors may be used. Suitable inhibitor levels are 10 to 3000 ppm. In certain embodiments, the concentration of inhibitors is 20 to 2000. In particular embodiments, the concentration of inhibitors is 50 to 1000 ppm.

The polymers of the present subject matter may be cured by free radical polymerization using methods well known to those skilled in the art. Suitable methods include heating in the presence of a thermal free radical initiator, exposing to electromagnetic radiation in the presence of a photoinitiator, or exposure to an electron beam or gamma radiation. In certain embodiments, the polymers are cured by exposure to ultraviolet light or electron beam.

Suitable photoinitiators for use with the present subject matter include benzophenone and benzophenone derivatives, thioxanthone and thioxanthone derivatives such as isopropyl thioxanthone and chlorothioxanthone, aryl phosphine oxides such as 2,4,6-trimethylbenzoyldiphenylphosphine oxide and phenyl bis(2,4,6-trimethylbenzoyl)-phosphine oxide, benzoin and benzoin derivatives, benzil ketals such as Irgacure 651, acetophenone and acetophenone derivatives such as Irgacure 184, Irgacure 369.

For certain applications, it may be desirable to use a "polymeric" photoinitiator with sufficiently high molecular weight to minimize any material extracting into for example food. Suitable polymeric photoinitiators include Esacure One from Lamberti, Genopol TX-1, Genopol AB-2, Genopol BP-2 from Rahn and Omnipol BP Omnipol SZ, and Omnipol TX from IGM Resin.

Other photoinitiators known to those skilled in the art are also suitable. It is also contemplated the mixtures of photoinitiators may be used.

Although the present subject matter has been described in association with emulsion pressure sensitive adhesives, it is contemplated that in certain applications it may be possible to use a hot melt pressure sensitive adhesive having suitable curing characteristics. It is also contemplated that pressure sensitive adhesives based upon solution polymers, i.e., solution polymer pressure sensitive adhesives, could also be used in accordance with the present subject matter.

Systems and Methods

Figure 5:
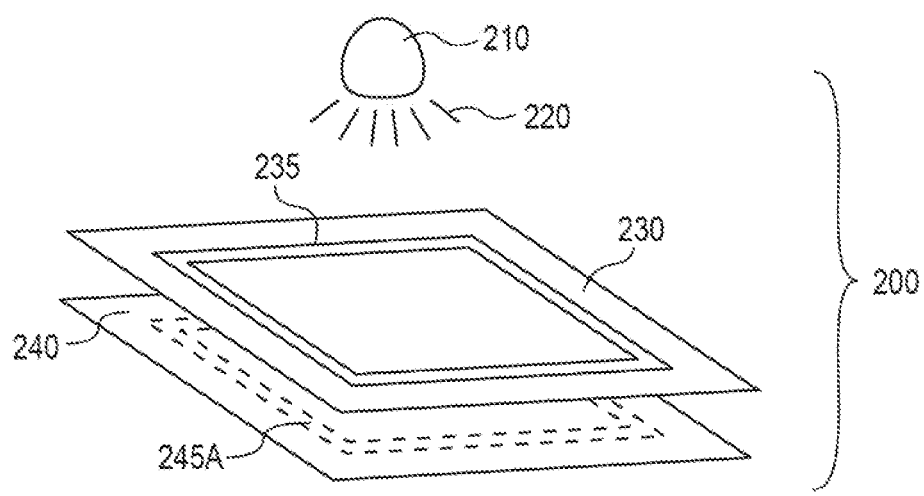
FIG. 5 is a schematic perspective view of a system for selectively detackifying regions of adhesive in a layered assembly in accordance with the present subject matter.
Figure 6:
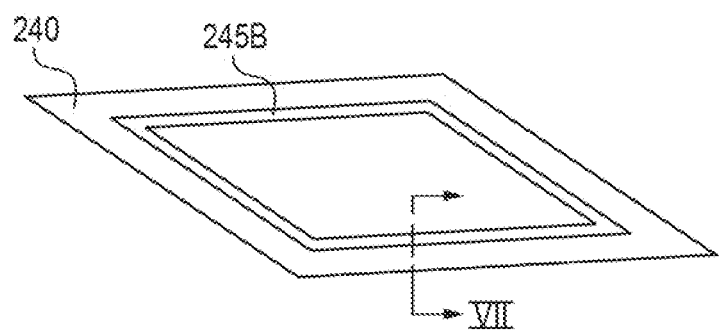
FIG. 6 is a schematic perspective view of a layered assembly having a select region of detackified adhesive in accordance with the present subject matter.
Figure 7:
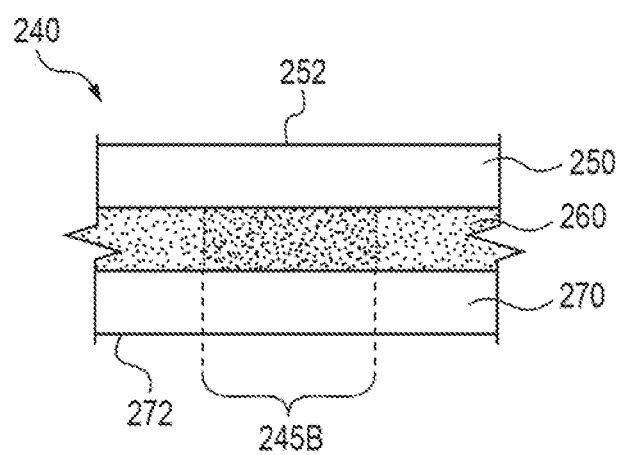
FIG. 7 is a schematic detailed cross sectional view of a layered assembly having a select region of detackified adhesive.

The present subject matter also provides various methods of selectively detackifying one or more regions of adhesive and particularly region(s) of an adhesive layer in a layered assembly. In certain embodiments, the methods of the present subject matter utilize a mask to selectively direct radiant energy to one or more regions of a layered assembly or at least facilitate the formation of detackified adhesive regions. FIGS. 5-7 schematically illustrate methods of, and systems for, selectively detackifying particular regions of an adhesive layer of a layered assembly. FIG. 5 schematically depicts a system 200 comprising a source 210 or emitter of radiant energy 220, and a mask 230. The system 200 can be used to selectively detackify region(s) of adhesive within a layered assembly such as 240. In certain embodiments, the system 200 may include the layered assembly 240. Specifically, the mask 230 defines one or more regions 235 that permit the passage of radiant energy 220 from the radiant energy source 210. For example, the passage regions 235 defined in the mask 230 can be in the form of openings or apertures extending through the thickness of the mask 230. Alternatively, the passage regions 235 can be regions of material that permit passage of the radiant energy from one side or face of the mask 230 to the other side or face. The remaining regions of the mask excluding the passage regions 235 should block or at least substantially block the radiant energy. The mask is configured to prevent exposure or keep exposure from the UV light or other radiant energy below the threshold for tack reduction in regions of the layered assembly that are not to be detackified.

Visual indication provisions can be included or otherwise incorporated in the layered assemblies to denote regions or areas of deactivation. For example, a color indicator can be used to denote regions or areas of a layered assembly that have been deactivated or which are to be deactivated. One or more color indicators can be in the form of pigments, dyes, inks, or the like which provide a visual indication. The color indicators can be incorporated into particular layers, regions, or components of the layered assemblies. Alternatively or in addition, the one or more color indicators can be applied or otherwise deposited on select areas or regions of the layered assemblies. It will be appreciated that the present subject matter is not limited to color indicators as described. Instead, the present subject matter includes any suitable means for denoting regions or areas of deactivation.

The system 200 is used to selectively detackify adhesive region(s) within a layered assembly by positioning the mask 230 between the source 210 of radiant energy 220 and the layered assembly 240 such that upon emission of the radiant energy, e.g., UV light, from the source 210, the radiant energy passes through the passage regions 235 defined in the mask 230 and irradiates desired region 245A of the layered assembly 240. The mask 230 prevents radiant energy from irradiating other regions of the layered assembly 240 besides the desired region 245A. Thus, the mask 230 is described herein as providing "exclusive irradiation" of one or more desired regions of a layered assembly. As will be understood, in many applications it is desirable to position the mask 230 relatively close to and in certain embodiments immediately adjacent to, the layered assembly 240 to reduce parallax error. And, in particular embodiments of the present subject matter, the mask 230 is in contact with the layered assembly 240.

After exposure, i.e., irradiation, of the selected region 245A of the layered assembly 240 to radiant energy 220 using the mask 230, a detackified region of adhesive 245B is formed within the layered assembly 240 as shown in FIGS. 6 and 7. FIG. 7 is a detailed schematic cross sectional view of the layered assembly 240 taken across line VII-VII in FIG. 6. FIG. 7 schematically depicts the detackified region 245B of adhesive 260 disposed between and bounded by a face layer 250 and a liner layer 270. In performing the irradiation of the region 245A (see FIG. 5) to form the region 245B, the radiant energy 220, e.g., UV light, may be directed to a face 252 of the face layer 250 and/or to a face 272 of the liner layer 270.

Figure 8:
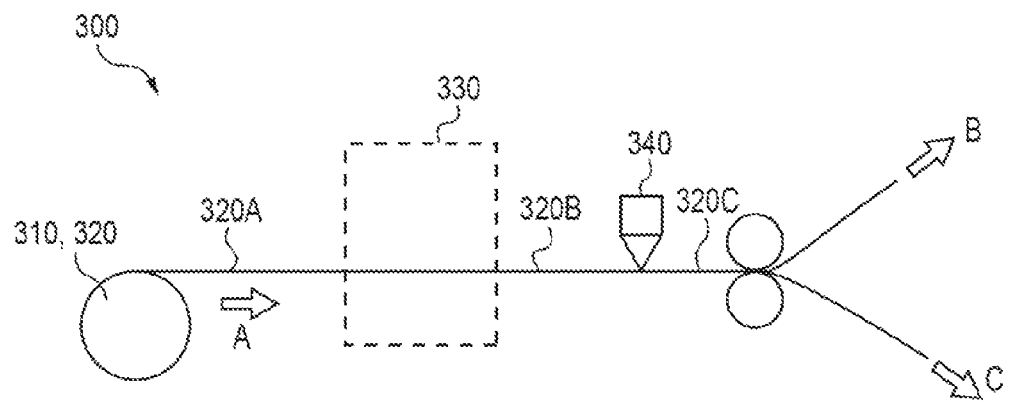
FIG. 8 is a process schematic illustrating a system and method in accordance with the present subject matter.

FIG. 8 schematically depicts another system 300 in accordance with the present subject matter. The system comprises a supply 310 of a layered assembly 320, a station 330 at which selective detackification is performed, and one or more processing units 340 such as a die cutter which cuts or scores the layered assembly within regions which contain detackified adhesive. More specifically, representative operation of the system 300 is as follows. Layered assembly 320 is supplied from a material source or supply 310 which may be in the form of a roll for example. The layered assembly 320 is generally as described herein and includes a layer or regions(s) of a radiant energy sensitive adhesive disposed between a face layer and a liner layer. The layered assembly prior to adhesive detackification is shown in FIG. 8 as 320A. The layered assembly 320A is transferred from the supply roll in the direction of arrow A towards the detackification station 330. The station 330 generally includes a source of radiant energy and provisions for selectively directing the radiant energy to desired areas or regions of the layered assembly 320. In certain embodiments, the provisions include a mask such as described herein. The layered assembly 320A enters the station 330 and selective detackification of certain adhesive regions is performed to thereby produce the layered assembly 320B. The layered assembly 320B is then directed to one or more processing units collectively shown in FIG. 8 as 340. In certain embodiments, the processing units 340 are kiss cutting units or other face layer processing units. After passing through the processing unit(s) 340, the processed layered assembly shown in FIG. 8 as 320C can be further processed such as passing through a matrix stripping operation in which waste matrix material is separated in the direction of arrow B from remaining portions of the layered assembly which may for example be transported in the direction of arrow C.

Figure 9:
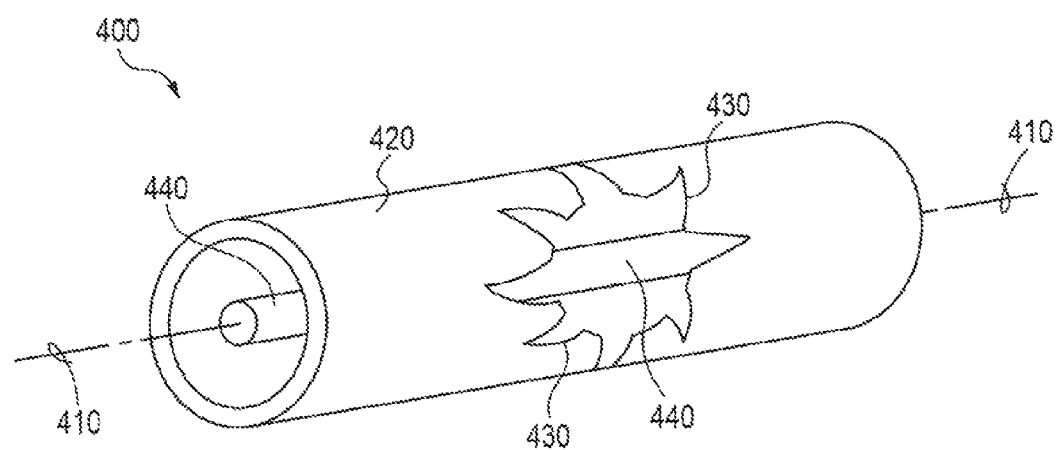
FIG. 9 is a schematic perspective view of a roller component in accordance with the present subject matter.

The present subject matter also provides particular components and/or equipment for performing selective detackification of adhesive regions within a layered assembly. FIG. 9 schematically depicts a detackifying roller 400 in accordance with the present subject matter. The roller 400 is in the form of a cylinder and defines an outer circumferential surface 420 that contacts the layered assembly or other material to be selectively irradiated with radiant energy. The roller 400 is configured to rotate about an axis of rotation 410. The roller 400 also comprises a source 440 of radiant energy such as an emitter of UV light. The roller 400 also defines one or more passage areas or regions 430 along the outer circumferential surface 420 that allow or permit the passage of radiant energy from the source 440 to the exterior of the roll 400. Thus, upon contact or appropriate placement of a layered assembly to be detackified along the roll, radiant energy such as UV light from the source 440 can pass through select regions of the roller, i.e., the passage regions 430, to the layered assembly and thereby reach certain regions of adhesive within the layered assembly. It will be understood that the present subject matter includes a wide array of patterns, shapes, arrangements, and/or configurations for the passage regions 430. Thus, in no manner is the present subject matter limited to the particular pattern of the passage region 430 depicted in FIG. 9.

In certain aspects of the present subject matter, and when utilizing the roller 400 or similar components, it may be desirable to provide drive controls or other control provisions such that the outer surface of the roller rotates in register control with a pattern repeated on the layered assembly, e.g., label. Insetting controls as known in the art can also be utilized. Although the embodiments described herein typically do not require focusing or magnification of the irradiated radiant energy, focusing and/or magnification provisions are included in the present subject matter.

The detackifying rollers such as roller 400 can include particular features such as the use of a honeycomb grated surface. The outer roll surface may be covered with flex plate or foil. For example, it is contemplated that a template containing artwork or other design(s) could be printed or otherwise be formed and positioned about a roll to thereby constitute the outer roll circumferential surface. The diameter of the roll can be selected to match a particular print or die size or an integer number of label repeats.

Figure 10:
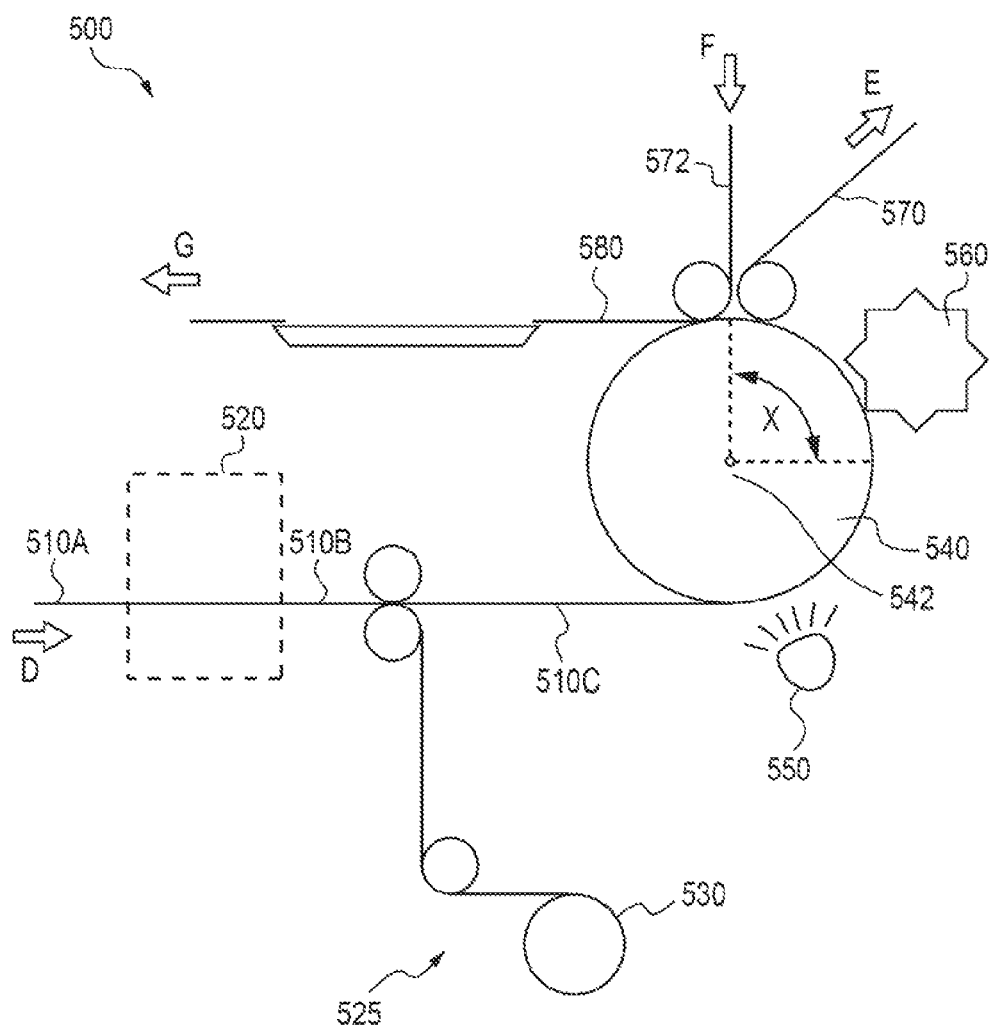
FIG. 10 is another process schematic illustrating a system and method in accordance with the present subject matter.

FIG. 10 schematically depicts another system 500 in accordance with the present subject matter. The system receives a source or supply (not shown) of a layered material 510A which includes a region of adhesive that is to be detackified. The layered material 510A is directed in the direction of arrow D to a detackifying station 520 similar to the previously described station 330 in FIG. 8. The detackifying station 520 emits radiant energy such as UV light upon select regions of the layered assembly to thereby reduce the adhesive tack in those regions and thereby produce the layered material 5106 having one or more detackified regions. It will be understood that the layered material 510A, 5106 can include print, text, or other indicia on one or more of its faces or regions. The system 500 can optionally include provisions 525 for separating and/or removing one or more layers such as a release liner from the layered assembly. The removed layer may be collected on a roller 530 or other component.

After separation of a liner or other layer via the provisions 525, a remaining portion 510C of the layered assembly is directed to a vacuum roller 540. Prior to, concurrently, or after contact between the portion 510C and the roller 540, one or more regions of the portion 510C may be further exposed to radiant energy such as from a radiant energy source 550. The radiant energy source 550 may be the same or different than the source of radiant energy utilized in the detackifying station 520.

The vacuum roller 540 rotates about an axis 542 and includes vacuum provisions along certain regions of the outer surface of the roller that promote engagement between the layered portion 510C and the roller 540. As is known in the art, the vacuum provisions typically include apertures along the circumferential outer surface of the roller 540 which expose the layered portion 510C (or other material layer or web) to reduced pressure which promotes retention of the layered portion 510C to the roller 540. Control provisions may be utilized to selectively adjust or vary the amount of circumferential surface region of the roller 540 along which the vacuum provisions are provided. Typically, in certain embodiments, the extent of surface region is denoted by angle X, which may be from about 30° to about 180° or more, and often about 90°. This configuration is typically referred to as a segmented vacuum roller.

The system 500 may also comprise a die cutter 560 or other processing component to directly apply cuts, scores, or perforations on the layered assembly 510C. In many embodiments, the cuts, scores, or perforations are located within a region of detackified adhesive.

The system 500 may additionally comprise separation provisions 570 for removing one or more layers from the layered assembly 510C and/or relamination provisions 572 for incorporating one or more layers with the layered assembly 510C. The separation provisions 570 remove one or more layers from the assembly 510C in the direction of arrow E. The relamination provisions 572 add or incorporate one or more layers with the assembly 510C in the direction of arrow F. Typically, in many embodiments, a die cutter is used to cut or form multiple articles from the layered assemblies 510C. The articles are then forwarded or otherwise positioned on a transfer belt 580. The speed of the transfer belt 580 is adjusted as desired. In certain embodiments, the linear speed of the transfer belt 580 is adjusted relative to the rotational speed of the roller 540 so as to create a spacing between adjacent articles. The transfer belt 580 can include vacuum provisions to promote retention of articles on the belt 580. The transported articles such as cut labels, can be further transported to another process station in the direction of arrow G. For example, the cut articles, e.g., labels, could be transported to a label application station for subsequent attachment to containers.

In certain applications, it may be necessary or at least desirable to protect the system, articles, and/or adhesive compositions from ambient UV light such as that from sunlight. However, the intensity of ambient UV is much lower than is typically used in UV processing. Two factors protect from unintended tack reduction under such weak exposures. One factor is that oxygen inhibits the tack reduction chemistry. Ambient air contains enough oxygen to suppress the tack reduction until a certain limiting light intensity is reached. While the detackifying threshold depends on many factors, in practice, sunlight is far below the threshold. Another factor relates to use of a free-radical stabilizer which can be added to the formulation which provides additional protection from low level UV exposure.

Many such stabilizers are known in the art. An example of such is 4-hydroxy TEMPO ("4HT"), used at 200 to 2,000 ppm.

The present subject matter includes numerous applications and processing techniques. For example, in one embodiment, by treating, i.e., exposure to select radiant energy, matrix areas of webs, the material properties of the matrix can be altered. This can be used to allow or promote easier removal of the matrix during a matrix stripping operation. This strategy may be useful when processing ultra thin constructions. Such altering of the material properties include, but are not limited to, reducing the release force and increasing mechanical properties of the matrix. Furthermore, in particular applications the face layer thickness can be reduced, thereby reducing costs.

In another embodiment, a label surface may be treated, i.e., exposed to select radiant energy, with the exception of an edge of the label. The treatment reduces the peel force of the label at a central or intermediate area, thus, promoting removal of the label from a container after use and once a corner of the label is lifted.

In another embodiment, a matrix is treated, i.e., exposed to radiant energy, along with a rim or edge portion of a label to prevent or at least reduce the potential of bleeding.

In yet another embodiment, a layered assembly is provided having multiple layers of adhesive and particularly two layers of adhesive. One layer of adhesive is a radiant energy sensitive adhesive. The peel force associated with the layered assembly can be selectively reduced by treating the entire label, without such treatment being confined to specific label areas. For example, a dual adhesive layer having a UV-sensitive adhesive layer disposed as a face layer or alongside a transparent face film or label is provided at a coatweight of 13 $g/m^2$. A second adhesive layer is provided along the UV-sensitive adhesive layer at a coatweight of 2 $g/m^2$. Alternatively, the second adhesive layer can be applied upon a container or bottle. The film or label is applied to the container and then treated, i.e., exposed to UV radiation, to deaden the UV-sensitive adhesive. This reduces the effective adhesive to a coatweight of 2 $g/m^2$ after treatment.

Another embodiment relates to forming a tray or container such as by molding so as to include a lid having a radiant energy sensitive adhesive layer that is selectively deadened in areas at which the container contents may contact the lid. The remaining portions of the lid are not treated so that those regions of the lid remain tacky and can seal or otherwise adhere the lid to the container.

In another embodiment, a dual layer adhesive system is coated such that a layer of the radiant energy sensitive adhesive is along an outer or face side, dried, and then treated on a conventional lamination machine. The previous reference to "treated" refers to exposing the radiant energy sensitive adhesive to certain radiant energy to thereby detackify or at least partially deaden that adhesive layer. The material containing such adhesive layers could be self wound. A self wound material can be used to laminate a printed film, for example polypropylene PP20 with reverse print on an inside face. An advantage of the resulting construction as compared to currently available materials is that one film layer can be eliminated. An example of applications for such labels and techniques includes beer and beverage labels in which over-lamination as known in the art is typical. The self wound material may alternatively, be printable by itself.

In accordance with the present subject matter, the reduction in adhesive tack can be specified relative to the tack prior to exposure to radiant energy. The present subject matter includes a reduction in tack of from 1% to 99%. For many applications, suitable reductions in tack are greater than 30%. Typically, reductions in tack are greater than 50%. And in certain embodiments, reductions in tack are greater than 75%. In particular embodiments, reductions in tack are greater than 90%. All of these tack reductions are relative to the initial tack of the subject adhesive prior to exposure to radiant energy. The minimum tack reduction will be a function of the specific application, the strength of the facestock used, and the starting tack of the adhesive. Tack can be quantified using a number of different tests or procedures. A typical method is Method PSTC-5 from "Test Methods for Pressure Sensitive Adhesive Tapes," $15^{th}$ Edition, from the Pressure Sensitive Tape Council. This method is typically referred to as "Loop Tack" by those in the art.

The present subject matter can also be utilized to prevent or at least reduce the potential of adhesive bleeding. As previously described herein, after die cutting adhesive laminates or facestock, a common problem is adhesive bleeding along peripheral or rim portions of the cut articles. Use of the present subject matter in which edge or rim regions of adhesive are selectively detackified dramatically reduces their flow tendencies. Thus, by exposing cut edges of labels for example to radiant energy such as UV light as described herein, the potential for bleeding along those regions can be significantly reduced.

In yet another embodiment, aspects of the present subject matter are utilized to promote label dispensing and enable thinner face materials to be dispensed. Generally, for applications involving separation of a liner, backing, or other layer from an adhesive label; by selectively detackifying a leading edge of the label, a reduced peel force can be achieved upon separation of the label from a liner for example. Reduced peel forces can lead to decreased tearing or damage of labels during dispensing and may also enable the use of thinner labels or enable a wider array of materials to be used as labels.

Figure 11:
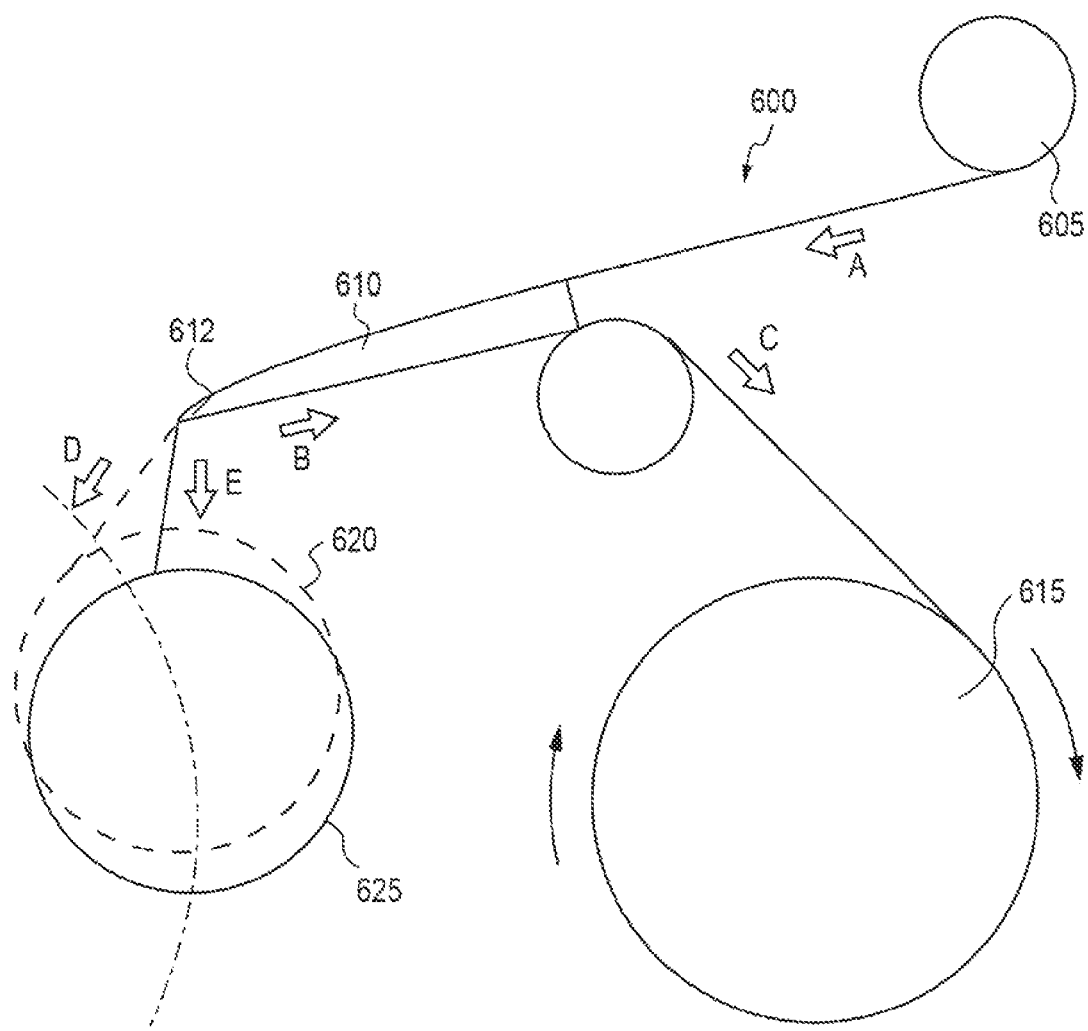
FIG. 11 is another process schematic illustrating a system and method in which peel force of certain regions of labels is reduced in accordance with the present subject matter.

FIG. 11 is a process schematic illustrating a label having its leading edge adhesion reduced by selective detackification as described herein. FIG. 11 also illustrates conventional dispensing of the same label without selective detackification. Specifically, FIG. 11 depicts a system 600 comprising a source of labels 605 with a release liner, provisions for separating a label and a liner such as a peel plate 610 typically used to facilitate separation of the liner from the label, and provisions 615 for collecting the liner after separation from the label. Linered labels which have been selectively detackified are directed from the source 605 and directed to the peel plate 610 as shown by arrow A. It is also contemplated that the label may be selectively detackified after dispensing from the source 605. As a selectively detackified label passes over a distal edge 612 of the peel plate 610, the liner is transported in the direction of arrows B and C and subsequently collected at 615. The label(s) are directed as shown by arrow D toward one or more articles to be labeled such as a bottle 620.

FIG. 11 also illustrates comparison of label dispensing and application of selectively detackified labels to label dispensing and application of conventional labels. A conventional label without selective detackification is shown passing from the peel plate 610 in the direction of arrow E to an article to be labeled such as a bottle 625.

Selective detackification in accordance with the present subject matter can be performed upon one or more region(s) of labels from the source 605. In many applications, selectively detackifying a leading edge of a label prior to separation of a liner, such as prior to the label reaching the distal edge 612 of the peel plate 610 results in a reduced peel force along the label leading edge, thereby allowing thinner labels to be used.

Figure 12:
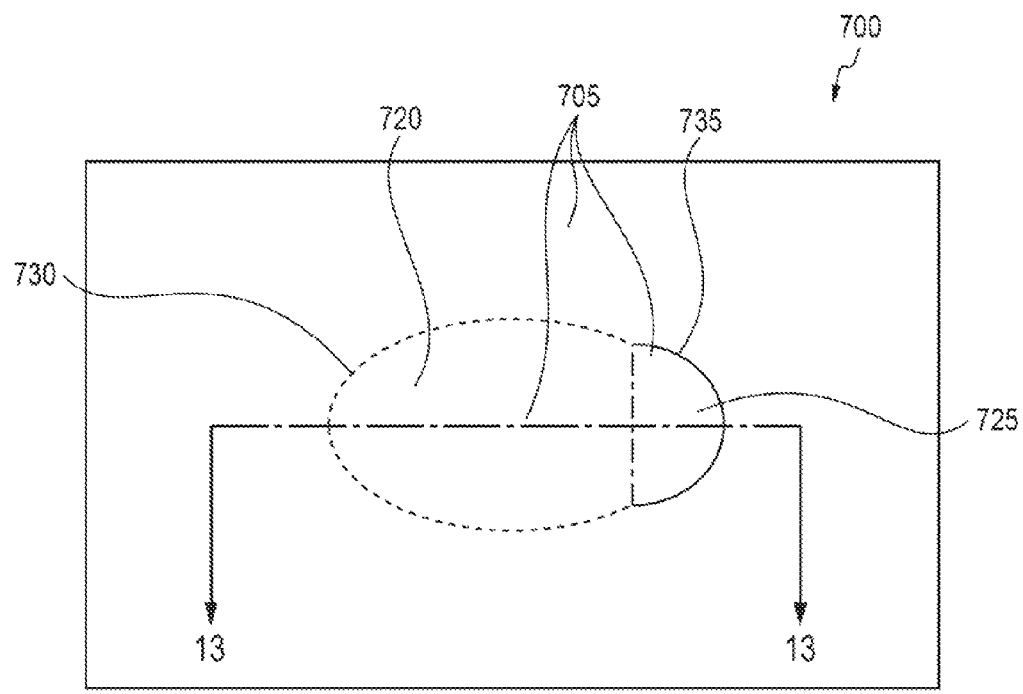
FIG. 12 is a schematic view of a layered adhesive assembly having multiple zones of reduced adhesion in accordance with an embodiment of the present subject matter.
Figure 13:
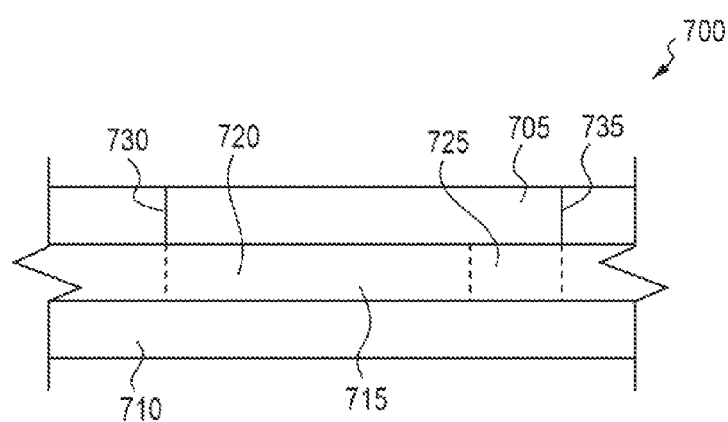
FIG. 13 is a schematic cross sectional view of the layered adhesive assembly of FIG. 12.

In still another embodiment, aspects of the present subject matter are utilized to provide various layered adhesive assemblies in which one or more regions of an adhesive are selectively detackified as described herein. FIGS. 12-13 schematically illustrate a layered adhesive assembly 700 which can for example be in the form of a coupon or other article having a first region which is separated from a remaining region and which such separation may be facilitated by providing a pull tab or other grasping member. The layered adhesive assembly 700 comprises a face layer 705, a substrate 710, and a layer or region of adhesive 715 disposed therebetween. One or more of these layers can be transparent and/or substantially transparent. It will be understood that the layered assembly 700 may comprise additional layers, and in many applications will include print, indicia, and/or other decorative or informational items. One or more regions or portions of the adhesive 715 are irradiated as described herein so as to reduce adhesion between the face layer 705 and the adhesive 715, and/or the substrate 710 and the adhesive 715. FIG. 12 depicts a zone 720 having such reduced adhesion. One or more lines or regions 730 can be formed or produced in the face layer 705 which may facilitate separating the portion of the layer 705 within the zone 720 of reduced adhesion from adjacent or bordering portions of the layer 705. The lines or regions 730 can be in the form of scores, cuts, or other weakening of the face layer 705. The lines or regions 730 generally extend around at least a portion of the zone 720. The layered assembly 700 can also include one or more regions or portions of the adhesive 715 which are irradiated as described herein so as to deaden adhesion, or substantially so, between the face layer 705 and the adhesive 715, and/or the substrate 710 and the adhesive 715. FIG. 12 further depicts a zone 725 having such deadened adhesion. One or more lines or regions 735 can be formed or produced in the face layer 705 which may facilitate separating the portion of the layer 705 within the zone 725 of deadened adhesion from adjacent or bordering portions of the layer 705. The line or region 735 generally extends around at least a portion of the zone 725. The lines or regions 735 can be the same as, or similar to, the previously described lines or regions 730. The zones of differing adhesion, e.g., zones 720 and 725 can be contiguous or immediately adjacent to one another. Alternatively, the zones of differing adhesion can be separated by one or more regions of adhesive which are not reduced or deadened in their adhesiveness or tack. The region(s) of adhesive which are not deadened or reduced in adhesion may constitute a third type or class of zones. An example of the adhesive assembly 700 is an assembly of a coupon, e.g., 720, which can be easily torn or separated from a carrier, e.g., 710, using a pull tab, e.g., 725.

Figure 14:
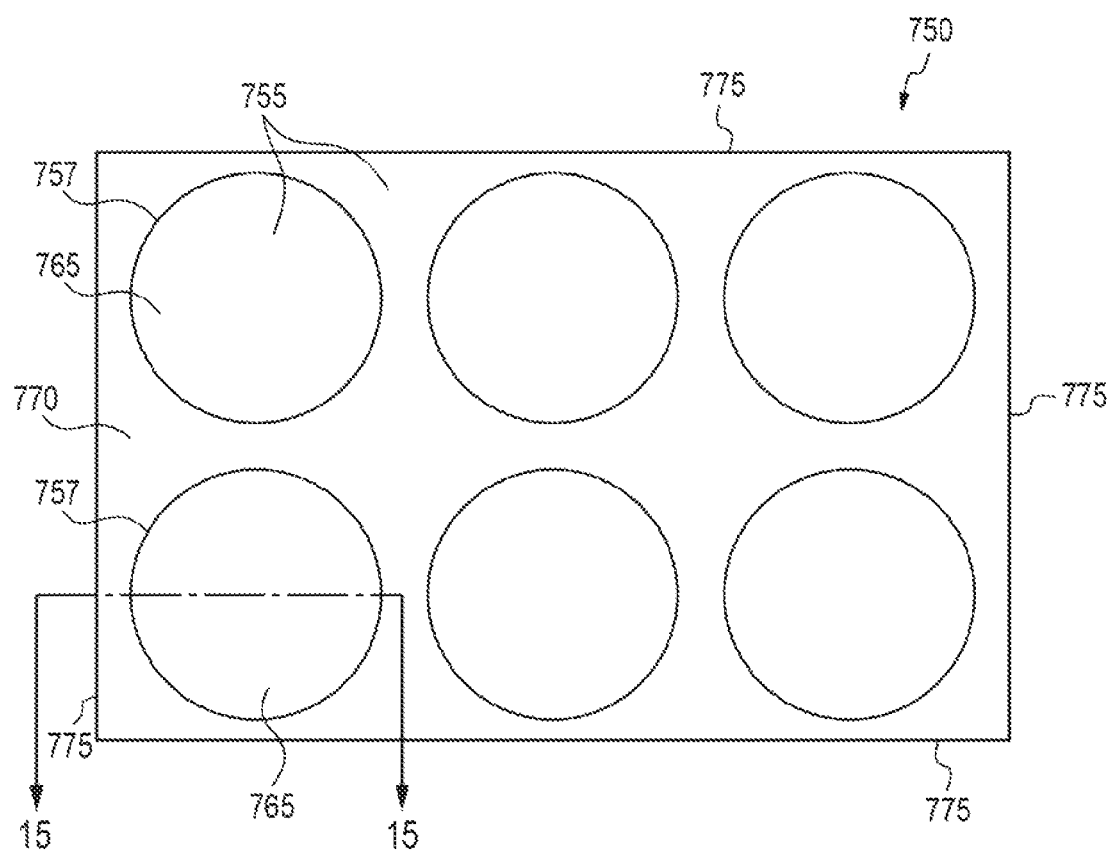
FIG. 14 is a schematic view of another layered adhesive assembly having one or more zones of reduced adhesion in accordance with an embodiment of the present subject matter.
Figure 15:
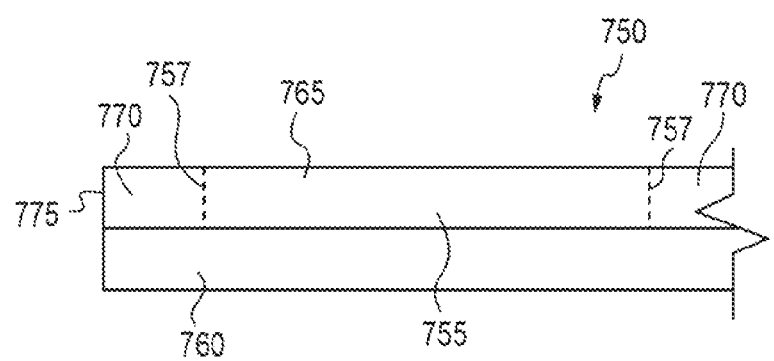
FIG. 15 is a schematic cross sectional view of the layered adhesive assembly of FIG. 14.

FIGS. 14-15 schematically depict another layered adhesive assembly having one or more zones of reduced or deadened adhesion in accordance with another embodiment of the present subject matter. Specifically, a layered adhesive assembly 750 comprises an adhesive layer 755 and a substrate 760. The assembly 750 may comprise one or more other layers. Any one or more of the layers can be transparent or substantially transparent. The adhesive assembly 750 includes one or more zones 765 of adhesive which has not been reduced in its adhesiveness and at least one other zone 770 of reduced adhesion or deadened adhesive. The zones 765 and 770 are generally separated by one or more lines or regions 757. Generally, the non-reduced adhesion or non-deadened zone(s) 765 is centrally located or at least defined within an interior region of the assembly 750 and thus is not immediately adjacent to an edge 775. An example of the adhesive assembly 750 is a graphic article having multiple regions of adhesive, e.g., non-deadened or non-reduced adhesion zones 765, and one or more peripheral edge regions of adhesive, e.g., 770, which have either been reduced in adhesion or deadened as described herein. Such adhesive articles may find wide application as the area(s) of reduced or deadened adhesiveness allow passage of air during application of the article to a surface of interest, i.e., contacting the adhesive layer, e.g., layer 755, to the article. Such adhesive articles may also find wide application because after their application, one or more peripheral edge regions, e.g., regions 770 extending along edge 775, can be lifted from the surface to which the article was applied to thereby expose the adhesive regions, i.e., zone(s) 765, and facilitate selective deadening of those regions as described herein to promote removal of the adhesive assembly from the surface.

Figure 16:
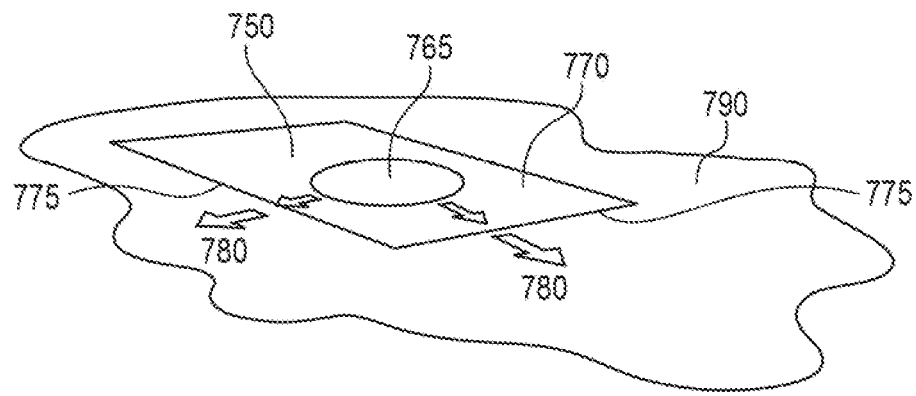
FIG. 16 is a schematic perspective view of the adhesive assembly of FIGS. 14-15 adhered to a surface.
Figure 17:
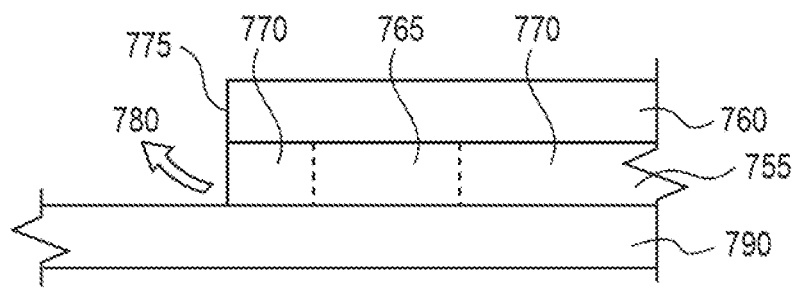
FIG. 17 is a schematic cross sectional view of the adhesive assembly and surface depicted in FIG. 16.

FIGS. 16 and 17 schematically depict application of the adhesive article 750 to a surface 790. During and after application, i.e., contacting the adhesive layer 755 with the surface 790, one or more air egress channels may result which promote and/or allow expelling of air schematically shown as arrows 780 along the interface between the adhesive layer 755 and the surface 790. Specifically, the one or more zone(s) 770 of reduced adhesiveness or deadened adhesive extending along edge 775 facilitate air egress. More specifically, in many embodiments, the adhesive assembly 750 includes one or more zones of reduced or deadened adhesion which are at least partially located between and exclusively between the zone of non-reduced or non-deadened adhesion, for example zone 765, and the edge 775. And in particular embodiments, the zone(s) of reduced or deadened adhesion is immediately adjacent to the zone(s) of non-reduced or non-deadened adhesion. In certain versions, the zone(s) of non-reduced or non-deadened adhesion is entirely surrounded by the zone(s) of reduced or deadened adhesion.

Referring further to FIG. 16, the present subject matter also provides methods of promoting adhesion between an adhesive article and a surface of interest and reducing occurrence of air bubbles along an interface between the article and the surface. The method comprises defining one or more interior zones of adhesive spaced from an edge of the article and one or more zones between the edge and the interior zone(s) of adhesive. The zone(s) along the article edge(s) is then irradiated to selectively detackify the adhesive to reduce its adhesion or to deaden the adhesive as described herein. The area(s) in which the adhesive has been reduced in adhesion or deadened, e.g., the edge zone(s), permit air egress during and after application of the article to a surface. Promotion of air egress reduces the occurrence of air bubbles along the interface between the adhesive layer and the surface.

Figure 18:
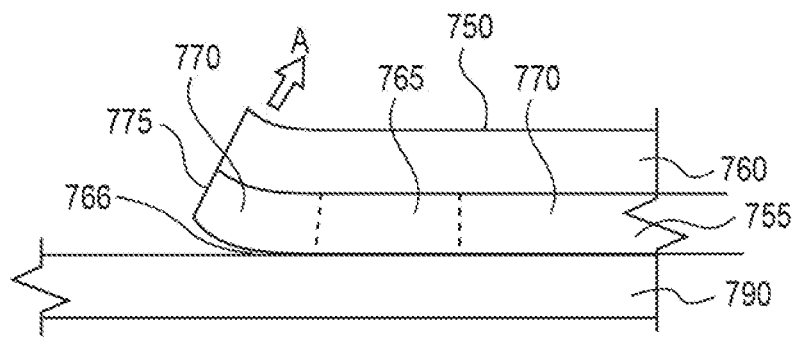
FIG. 18 is a schematic cross sectional view of the adhesive assembly of FIGS. 16-17 during removal from the surface.

FIG. 18 schematically illustrates removal of the adhesive article 750 which may for example be a label, from the surface 790. In this removal technique, a portion of the article 750 and particularly a portion along edge 775, is pulled in the direction of arrow A away from the surface 790 to thereby expose at least a portion of the adhesive 765. The portion of adhesive 765 that is exposed is exposed along an interface 766 generally defined between the adhesive 755 and the surface 790. The exposed adhesive 755 can then be irradiated as described herein to selectively detackify and/or deaden the adhesive to provide for easy removal of the article 750 from the surface 790.

The present subject matter includes exposing the adhesive to radiant energy prior to label application, during label application, after label application, or any combination thereof. For example, a label having adhesive as described herein which can be detackified or deadened upon sufficient exposure to radiant energy, can be applied to a surface of interest. After application removal of the label from the surface can be promoted by exposing the adhesive to radiant energy. Such exposure can be performed by directing radiant energy along the interface between the label and the surface such as schematically depicted in FIG. 18, and/or by directing radiant energy through a front substrate such as substrate 760, and/or by directing radiant energy through the surface to which the label is adhered, i.e., towards a rear face of the label.

The present subject matter includes variant configurations of the layered adhesive assembly such as the assembly 750 depicted in FIGS. 14-15. For example, the zones 765 and 770 could be reversed such that zone 770 could include adhesive that has not been reduced in adhesion or deadened and zone 765 could include adhesive that has been reduced in adhesion or deadened. Thus, in such a variant embodiment, the layered adhesive assembly includes an interior zone of low tack adhesive which has been deadened or reduced in adhesion by exposure to radiant energy, and an exterior zone of high tack adhesive. In particular versions of this variant embodiment, the high tack zone surrounds the interior low tack zone, and the high tack zone may also extend immediately adjacent to an outer edge of the layered assembly. Such label configurations provide easy and "clean" removal of the label from a surface to which the label was previously applied.

Figure 19:
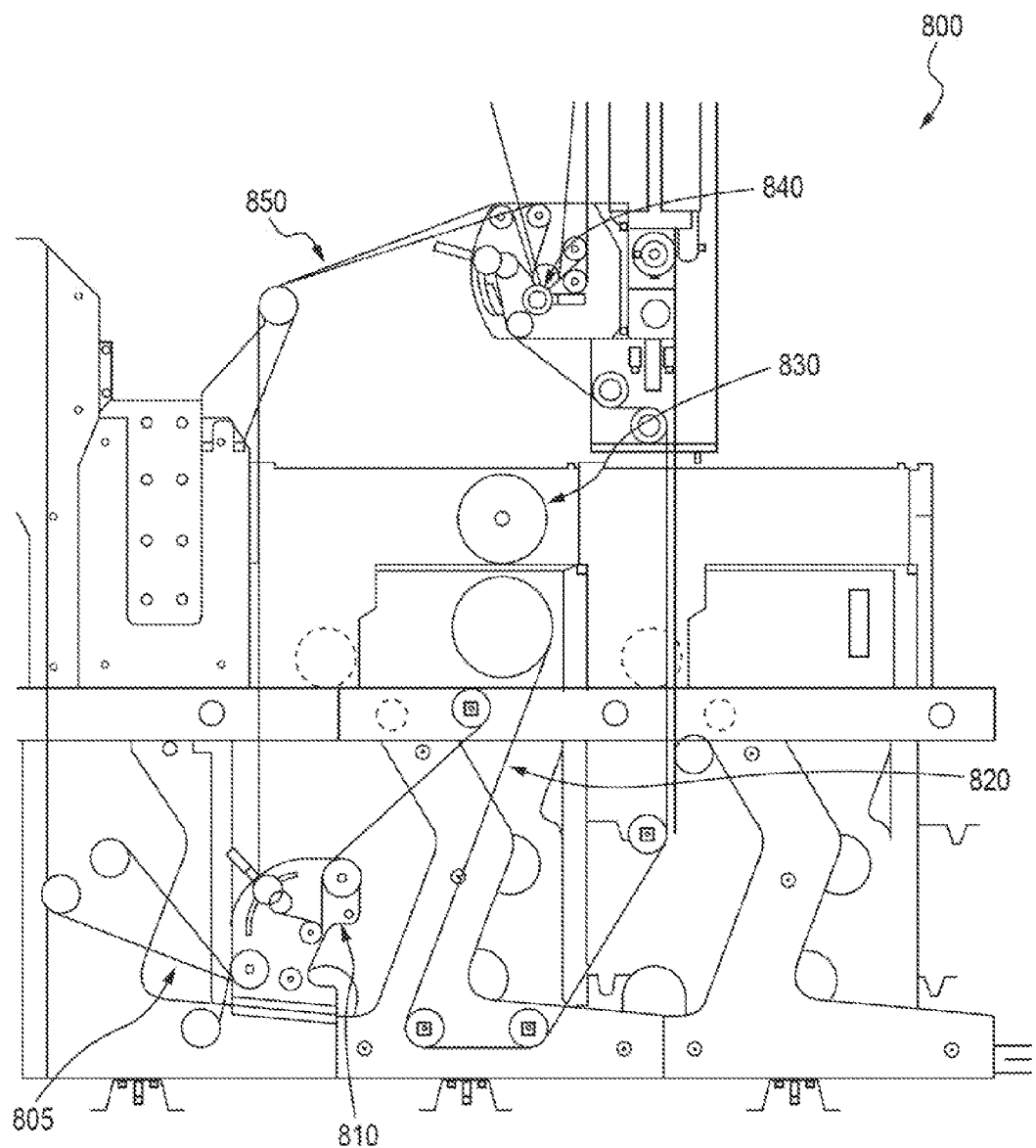
FIG. 19 is a schematic illustration of a system and process for delaminating, selectively detackifying one or more regions of adhesive, and relaminating an adhesive assembly in accordance with an embodiment of the present subject matter.

FIG. 19 schematically illustrates a system 800 and method for performing one or more delamination and relamination operations using an adhesive assembly including a facestock layer, a release liner, and an adhesive that undergoes a reduction in tack upon sufficient exposure to radiant energy. The system 800 comprises an inlet 805 at which an adhesive assembly is provided. The adhesive assembly is directed to delamination provisions 810 in which the release liner is separated from the adhesive layer. The resulting facestock layer having an exposed adhesive face is directed to a rotary mask 830, which can be for example in the form of the system described in conjunction with FIG. 9 herein. The adhesive layer is then selectively irradiated with sufficient radiant energy to thereby selectively detackify one or more regions of the adhesive layer. After selective detackification, the adhesive assembly is directed to relamination provisions 840 at which the facestock and selectively detackified adhesive layer are combined with a release liner 850, and in many applications, the same release liner that was previously delaminated at provisions 810. The produced adhesive assembly can be wound into a roll form.

The present subject matter also provides a variety of labels uniquely suited for particular applications. For example, the present subject matter can be used to form one or more air egress passages, regions, or channels along an adhesive face of a label. The air egress regions can extend across one or more portions of a label face, and typically extend from an interior face region to one or more edges. As will be appreciated, providing air egress regions facilitates and promotes removal of air from between the label and a surface to receive the label during and after label application. Removal of air bubbles, otherwise trapped between the label and the surface, reduces the occurrence of label blisters, visible air bubbles under the label, and other label defects.

FIGS. 20-22 illustrate a label 900 in accordance with an embodiment of the present subject matter having one or more regions 905 for air egress. The label comprises a label face layer or substrate 920 having a layer of adhesive 910 as described herein. Upon sufficient exposure to radiant energy, the exposed adhesive undergoes a reduction in tack. And, upon sufficient exposure to radiant energy, the exposed adhesive becomes adhesively deadened. The air egress regions or "lanes" 905 can be formed using a variety of techniques including for example, a mask as shown in FIG. 5 or a detackifying roller as depicted in FIG. 9. The air egress regions or lanes 905 extend to one or more edges 902 of the label 900, and specifically to the outer edge(s) of the face layer 920. The air egress regions 905 can be formed in nearly any pattern such as a grid pattern depicted in FIGS. 20 and 22. However, the present subject matter includes forming the air egress regions in non-uniform arrangements. Typically, if the air egress regions 905 are formed in a grid pattern, each region or lane 905 of deadened adhesive has a width such as $w_1$ and/or $w_2$ of from about 500 microns up to about 10,000 microns. However, it will be appreciated that the present subject matter includes air egress regions having widths less than 500 microns and/or greater than 10,000 microns. For patterns of air egress regions, such as a grid pattern depicted in the referenced figures, the air egress regions 905 may have multiple or different widths such as $w_1$ being a first width and $w_2$ being a second width. In particular applications, it may be beneficial to form air egress regions having a relatively long length to have a width greater than the width of air egress regions which are shorter in length. Furthermore, if a grid pattern is used, the grid pattern may be non-uniform such that the spacing or distance between adjacent air egress regions or lanes 905 is different at various locations along the adhesive face. Upon application of the adhesive label to a container, air bubbles between the adhesive layer and the container are displaced along the regions of deadened adhesive toward the outer edge of the label. Labels such as label 900 will find wide application and particularly for freshly blown high density polyethylene (HDPE) and polyethylene terephthalate (PET) bottles or containers. Labels such as label 900 will also find wide application as pressure sensitive labels which exhibit improved "wipedown" as a result of increased air egress under the applied label. Furthermore, labels such as label 900 will find particular application where improved "laydown" and wet-out is desired, such as for many labeling applications involving clear containers.

Adhesive assemblies or labels described herein such as those depicted in FIGS. 14-18 and 20-22 can be used in various methods and techniques for reducing occurrence of air bubbles between a label and a surface to which the label is applied. Generally, the methods involve providing a label that includes one or more regions of adhesive as described herein, and in which select regions of the adhesive have been deadened or reduced in adhesion. In particular embodiments, one or more air egress regions such as channels 905 depicted in FIGS. 20 and 22 are formed. The label is applied to the surface and any air bubbles between the adhesive layer and the surface are displaced along the regions of deadened adhesive toward the outer edge of the label. In certain applications, displacement of air bubbles can be promoted by wiping the outer face of the label.

Figure 23:
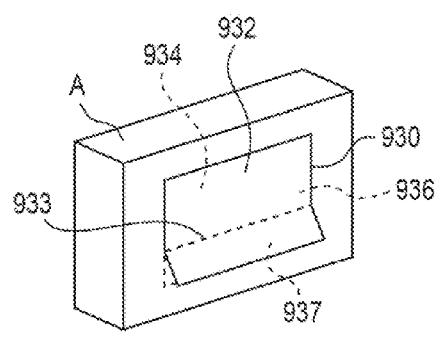
FIG. 23 is a perspective view of a container and a label in accordance with another embodiment of the present subject matter.
Figure 24:
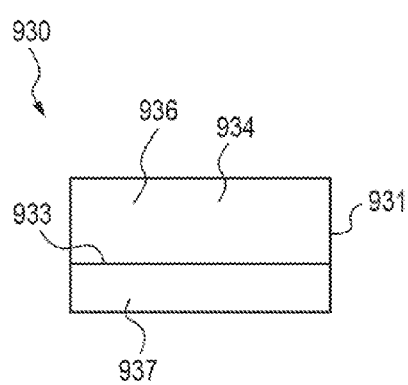
FIG. 24 is a view of an adhesive face of the label shown in FIG. 23.

The present subject matter also provides labels with one or more adhesive regions which have been exposed to radiant energy to thereby form region(s) of reduced tack or deadened adhesive. Incorporation of such aspects enable the use of non-traditional labels such as labels which extend outward from a container face, labels which can be folded outward from a container surface, and labels that can contain text, designs, and/or markings along a rear face of the label for viewing. FIGS. 23 and 24 depict a container A having an outer surface with a label 930 adhered thereto. The label 930 defines an outer edge 931, a front face 932 and an oppositely directed rear face 934. The label 930 includes a layer of adhesive as described herein along its rear face 934. The adhesive is selectively exposed to radiant energy to form one or more regions of deadened adhesive such as region 937 adjacent the edge 931 or a portion thereof while leaving one or more regions of non-deadened adhesive 936. The regions 936 and 937 are separated by a border 933 which may also constitute a fold line for the label. Thus for example, a lower region of the label 930 can be folded or extended outward from the container A to reveal a rear face of the label which can include additional text, designs or the like. The lower region 937 of deadened adhesive is defined along a lower edge portion of the outer edge 931. The present subject matter includes versions in which region(s) of deadened adhesive extend along top portions, side portions, bottom portions, or combinations thereof, of the outer edge.

Figure 25:
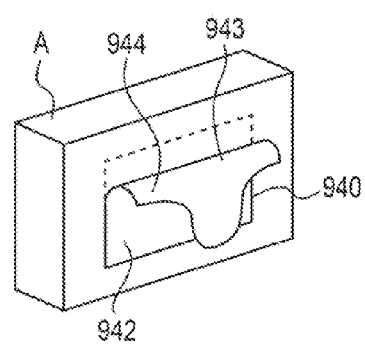
FIG. 25 is a perspective view of another container and a label in accordance with another embodiment of the present subject matter.
Figure 26:
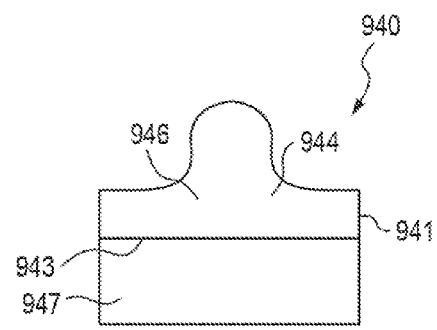
FIG. 26 is a view of an adhesive face of the label shown in FIG. 25.

FIGS. 25-26 illustrate another embodiment of a label 940 and container A. In this version, a rear adhesive face of the label 940 is selectively deadened as described herein to form an upper region 946 adjacent an outer edge 941 in which the adhesive has been deadened, and a lower region 947 in which the adhesive has not been deadened or reduced in tack. The label defines a front face 942 and an opposite rear face 944. Upon application to the container A, an upper region of the label 940 may extend outward from the container A, and can in certain instances, hang or be folded downward to reveal a portion of the label rear face 944. The label can also be adhered to a container such that the upper, top region of the label containing one or more regions of deadened adhesive extends above the container, and the lower region of the label containing nondeadened adhesive is used to adhere the label to the container. In many applications, the region(s) of deadened adhesive can also include text, indicia, designs or other markings. The regions 946 and 947 may be separated by a border 943 and thus upon label application to the container A, the upper portion of the label may be folded or otherwise deformed along the border 943. The upper region 946 of deadened adhesive is defined along an upper edge of the outer edge 941. Labels such as labels 930 and 940 depicted in FIGS. 23-26 can be used in various point-of-purchase (POP) applications. Various point-of-purchase labels are described in WO 2012/123814. The present subject matter includes a wide array of labels and is not limited to those described herein or shown in the noted figures. For example, the present subject matter includes labels which include lateral or side regions of deadened adhesive.

Figure 27:
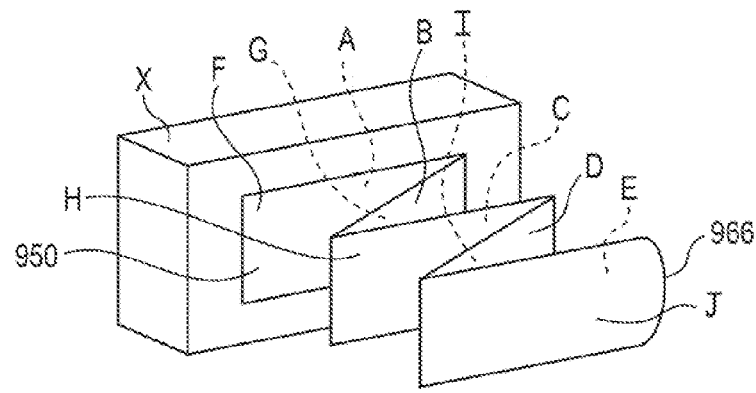
FIG. 27 is a perspective view of still another container and a label in accordance with another embodiment of the present subject matter.
Figure 28:
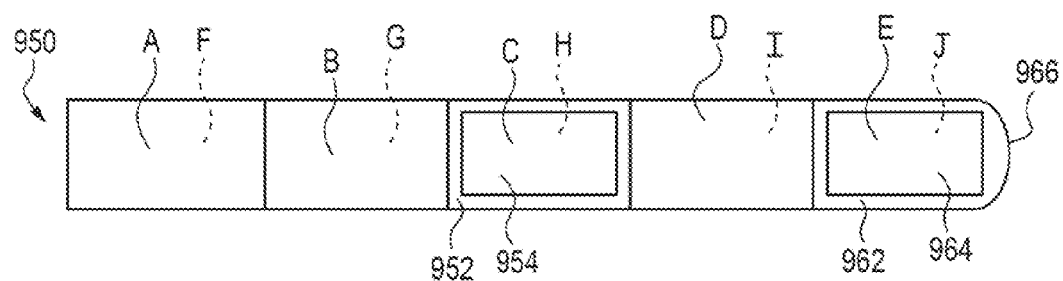
FIG. 28 is a view of an adhesive face of the label shown in FIG. 27.

The present subject matter also provides expanded content labels (ECL) in which one or more region(s) of a label can be accessed to reveal additional label region(s) that are covered or not exposed when the label is in its initial applied configuration to a container. In many applications, an expanded content label includes one or more rear faces of the label which can be accessed to reveal additional text or information printed thereon. For example, FIGS. 27 and 28 illustrate a label 950 adhered to a container X. The label 950 defines a plurality of panels A-E along one face, and another plurality of panels F-J along another face. Panel A includes an adhesive as described herein which is not deadened, or may include a conventional adhesive. Generally, the label defines one or more fold lines that separate adjacent panels. In many embodiments, the panels can include text, designs, and/or indicia on one or more of the panels. And in certain label versions, the various printing or markings are provided on adjacent panels which are separated by a fold line. In certain label versions, the one or more regions of deadened adhesive are surrounded by non-deadened adhesive. The label 950 is folded such as Z-folded into a relatively flat configuration and adhered along panel A to the container X. The panel J is exposed along the outer surface of the container, and covers or substantially covers all remaining panels of the label 950. The selective adhesive deadening techniques and aspects described herein can be used to form a region of deadened adhesive 954 defined within an adhesive border 952, within a panel C of the label; and another region of deadened adhesive 964 defined within an adhesive border 962, within a panel E of the label 950. A tab 966 with non-deadened adhesive can be included with the label 950 such that upon folding the label, and adhering the label to the container X along panel A, the tab 966 is adhered to the container X to retain the label in its folded configuration. As will be appreciated, a consumer can access additional text and/or product information on one or more of panels G, B, C, H, I, and E by releasing the tab 966 and extending the label 950 from the container X.

Figure 29:
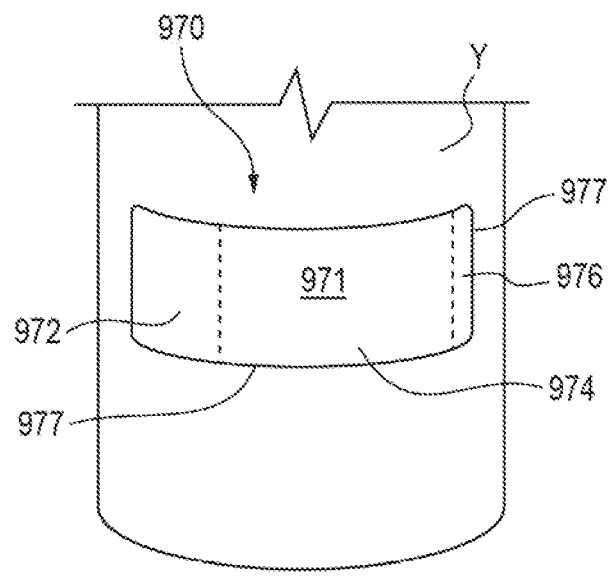
FIG. 29 is a front view of another container and a label in accordance with another embodiment of the present subject matter.
Figure 30:
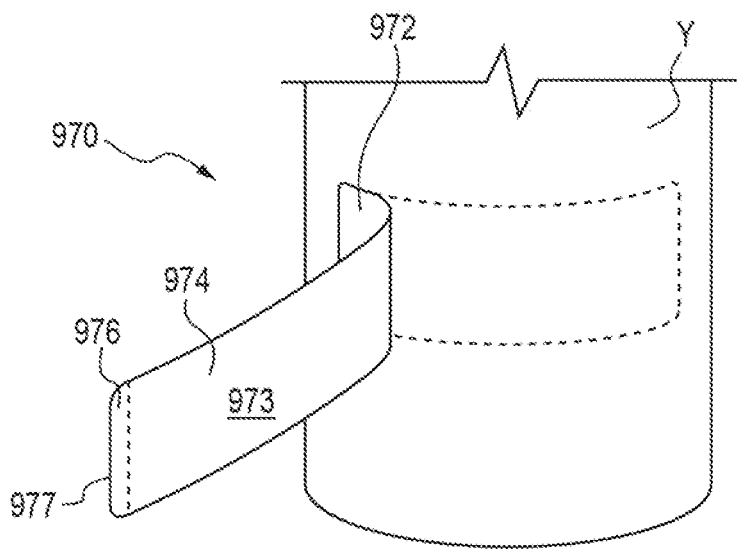
FIG. 30 is a front view of the label of FIG. 29 partially detached from the container to reveal a rear face of the label.

FIGS. 29 and 30 illustrate another example of an expanded content label in accordance with another embodiment of the present subject matter. FIGS. 29 and 30 illustrate a label 970 adhered to container Y. The label 970 defines a front face 971, an oppositely directed rear face 973, and an outer edge 977. A layer of adhesive as described herein extends along the rear face 973. Various zones are defined along the adhesive layer and along the rear face 973 of the label 970. A first zone 972 includes adhesive which has not been exposed to radiant energy and thus is not reduced in adhesion or deadened. A conventional adhesive can be used in the zone 972. A second zone 974 includes adhesive which has been fully deadened or substantially so. Various text, indicia, logos, and/or designs can be provided within the second zone 974 along the rear face 973 of the label 970. A third zone 976 includes adhesive which has been partially reduced in adhesion to thereby provide a removable bond upon detachment from the container Y as shown in FIG. 30. Thus, for label 970, the zone 976 of reduced adhesion extends immediately alongside the outer edge 977 and provides a removable tab portion for the label 970. As shown in FIG. 30, the label 970 can be partially detached from the container Y by pulling the portion of the label at which zone 976 is located, away from the container to thereby expose or reveal the zone 974 along the rear face 973 of the label 970. It will be understood that the present subject matter includes a wide array of configurations of labels with various arrangements and locations of zones of (i) reduced adhesion, (ii) completely deadened adhesive, and (iii) non-reduced adhesion or non-deadened adhesive. That is, in no way is the present subject matter limited to any of the representative embodiments described or shown herein.

EXAMPLES

Example 1

Evaluation of Adhesives

A series of investigations were performed to evaluate a particular adhesive and its ability to be selectively detackified by exposure to UV radiation. Specifically, layered assemblies of face stock, a release liner, and a layer of an adhesive disposed between the face stock and the release liner were prepared. UV radiation at various dosages was then directed through either the face stock layer or the liner layer to thereby detackify the adhesive. Layered assemblies in accordance with the present subject matter using a UV-sensitive adhesive were compared to corresponding assemblies using an adhesive not sensitive to UV radiation. Table 1 summarizes the layered assemblies.

TABLE 1

Summary of Constructions of Samples 1-8

| Sample | Adhesive | Face Stock | Liner |
|---|---|---|---|
| 1 | UV-sensitive | SC 56 gsm | PET-23 |
| 2 | Not UV-sensitive | SC 56 gsm | PET-23 |
| 3 | UV-sensitive | Metallized | PET-23 |
| 4 | Not UV-sensitive | Metallized | PET-23 |
| 5 | UV-sensitive | Vellum | PET-23 |
| 6 | Not UV-sensitive | Vellum | PET-23 |
| 7 | UV-sensitive | MC Prime Coat | PET-23 |
| 8 | Not UV-sensitive | MC Prime Coat | PET-23 |

The UV-sensitive adhesive used in Samples 1, 3, 5, and 7 was prepared by a method described in Example 2. Specifically, the method involved first building an emulsion polymer of composition 76% ethyl hexyl acrylate, 12% methyl methacrylate, 6% methyl acrylate, 6% methacrylic acid, 0.02% ethylene glycol dimethacrylate, and 0.02% n-dodecylmercaptan (76 EHA/12 MMA/6MA/6 MAA/0.02 EDGMA/0.02 nDDM). This material was then treated with an additional 3.5% GMA, using a procedure similar to that taught in U.S. Pat. No. 5,306,744. An effective amount of a photoinitiator (a 50/50 mixture of bis(2,4,6-trimethylbenzoyl)-phenylphosphineoxide and 2-hydroxy-2-methyl-1phenyl-propan-1-one which is commercially available from Ciba Specialty Chemicals as DAROCUR 4265) is then added. The other adhesive used in Samples 2, 4, 6, and 8 was S692N available from Avery Dennison. S692N has composition 81% ethyl hexyl acrylate, 12% methyl methacrylate, 6% methyl acrylate, 1% acrylic acid, 0.4% ethylene glycol dimethacrylate, and 0.02% n-dodecylmercaptan (81 EHA/12 MMA/6 MA/1AA/0.4 EGDMA/0.02 nDDM).

The PET-23 liner was polyethylene terephthalate (PET) film having a thickness of 23 μm.

Face stock materials SC 56 gsm is available from FASSON and metallized paper is also available commercially.

The vellum face stock was noncoated paper grade.

MC Prime Coat is coated paper grade.

Figure 3:
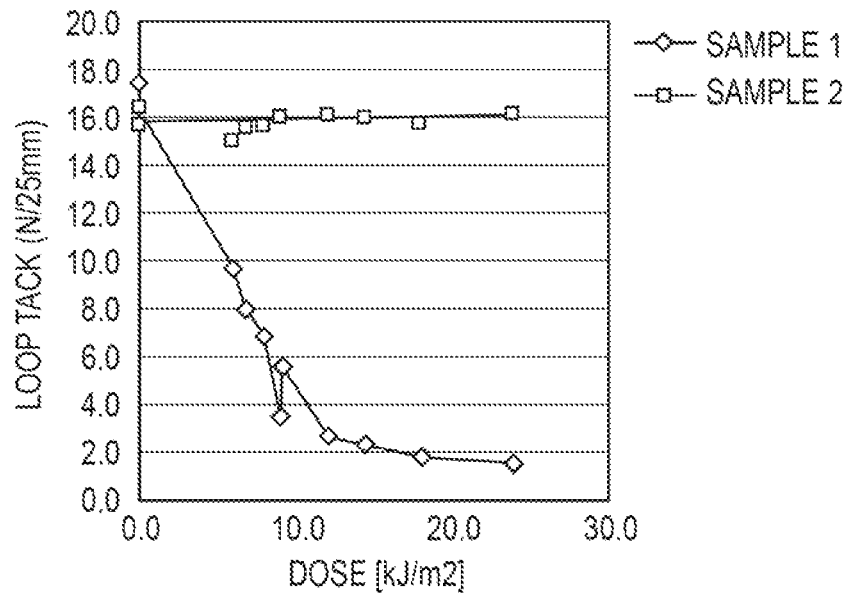
FIG. 3 is a graph showing reduction in tack of adhesive in accordance with the present subject matter.
Figure 4:
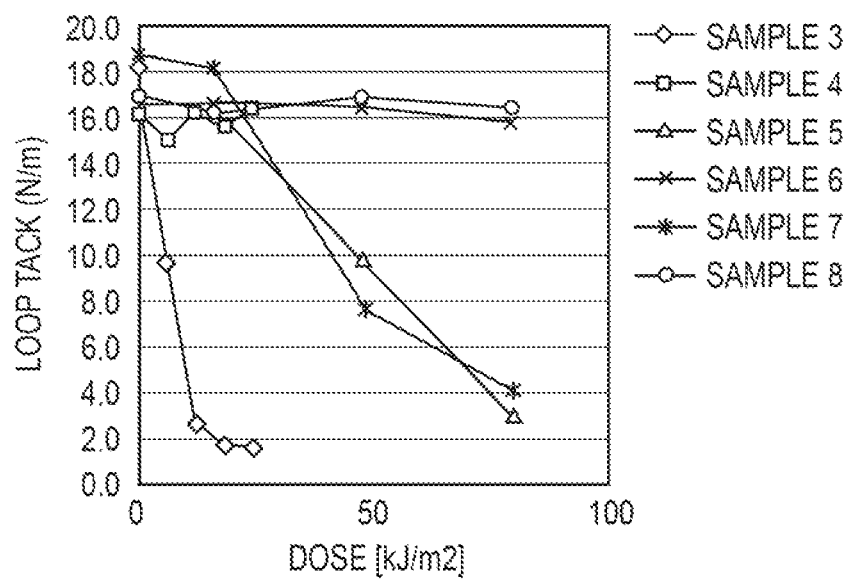
FIG. 4 is another graph showing reduction in tack of adhesive in accordance with the present subject matter.

Referring to FIG. 3, Samples 1 and 2 were exposed to increasing dosages of UV radiation. The adhesive layers of each sample were irradiated with UV radiation that passed through their liner layers. At designated intervals during such exposure, loop tack measurements of the irradiated adhesive faces were obtained. Dose in FIGS. 3 and 4 is calculated using a lamp intensity in W/m or W/inch and the speed of the moving web in m/s. 1 W/m equals 1 J/s. Dividing the intensity with the web speed results in $J/m^2$ as the units for dose. As demonstrated in FIG. 3, Sample 1 exhibited a significant reduction in loop tack with increasing exposure to UV radiation. In contrast, Sample 2 exhibited a relatively constant loop tack value that did not significantly change during increasing exposure of UV radiation.

Referring to FIG. 4, regardless of whether UV radiation was directed through a PET-23 liner, vellum face stock, or MC Prime face stock, the samples utilizing a UV-sensitive adhesive, i.e., Samples 3, 5, and 7, all exhibited a significant reduction in loop tack upon increasing exposure to UV radiation. This behavior is significantly different than that of Samples 4,6, and 8 which utilized an adhesive that was not UV-sensitive.

Samples 1-4 (SC 56 gsm and metallized paper) demonstrate exposure through the PET-23 side. Both face stock materials (SC 56 gsm and metallized paper) have a high optical opacity and the UV light is blocked from the face stock side.

Samples 5-6 (vellum and MC Prime Coat) demonstrate exposure through the paper side (face stock) as the opacity is close to 80%.

In another evaluation, functionalization of an emulsion polymer was investigated.

Example 2

Functionalization of Emulsion Polymer 611 g of an emulsion polymer with composition 76 EHA/12 MMA/6 MA/6 MAA/0.02 EGDMA/0.02 nDDM with particle size 350 nm and 57% solids was introduced into a resin kettle fitted with a reflux condenser and mechanical stirrer. 3.12 g of 19% ammonia in water was added (0.15 equivalents, based on MAA), followed by 8.22 g of 55% tetrabutylammonium hydroxide in water (0.075 equivalents based on MAA). The mixture was stirred and heated to 80° C.

A solution of 0.35 g 4-hydroxy TEMPO in 21.5 g glycidyl methacrylate (6.4% based on polymer, 0.65 equivalents based on MAA) was added to the heated mixture over a 15 minute period. The mixture was stirred at 80° C. for four hours, then cooled to room temperature.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A layered assembly comprising:
   a face layer;
   a release layer;
   a layer of adhesive disposed between the face layer and the release layer, wherein upon sufficient exposure to radiant energy, the exposed adhesive undergoes a reduction in tack;
   wherein at least one of the face layer and the release layer is at least substantially transparent to an extent such that upon the exposure to radiant energy, the at least one of the face layer and the release layer permit radiant energy to pass therethrough to the adhesive.

2. The layered assembly of claim 1 wherein the face layer is at least substantially transparent.

3. The layered assembly of claim 1 wherein the release layer is at least substantially transparent.

4. The layered assembly of claim 1 wherein the adhesive comprises an effective amount of functionalized emulsion polymer.

5. The layered assembly of claim 4 wherein the functionalized emulsion polymer is prepared by treating an emulsion polymer having carboxylic acid functional monomers with at least one ethylenically unsaturated monomer including an epoxy group in the presence of a suitable catalyst.

6. The layered assembly of claim 5 wherein the carboxylic acid functionalized monomers are selected from the group consisting of acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate, acryloxyethyl acid phthalate, and combinations thereof.

7. The layered assembly of claim 5 wherein the ethylenically unsaturated monomer including an epoxy group is selected from the group consisting of glycidyl methacrylate, glycidyl acrylate, acrylated epoxidized soybean oil, allyl glycidyl ether, 3,4-epoxycyclohexyl methyl methacrylate, and combinations thereof.

8. The layered assembly of claim 5 wherein the catalyst is selected from the group consisting of tetrabutyl ammonium hydroxide, methyl tributyl ammonium hydroxide, ammonium hydroxide, tetrabutyl ammonium chloride, methyltributyl ammonium chloride, triphenyl phosphine, chromium acetate, and combinations thereof.

9. The layered assembly of claim 4 wherein the adhesive further comprises:
an ultraviolet photoinitiator.

10. The layered assembly of claim 1 wherein upon sufficient exposure to radiant energy, the adhesive undergoes a reduction in tack of at least 30% as compared to its initial tack prior to the exposure.

11. The layered assembly of claim 10 wherein the adhesive undergoes a reduction in tack of at least 50%.

12. An adhesive composition which upon sufficient exposure to radiant energy undergoes a reduction in tack, the composition comprising:
an effective amount of functionalized emulsion polymer.

13. The adhesive composition of claim 12 wherein the functionalized emulsion polymer is prepared by treating an emulsion polymer having carboxylic acid functional monomers with at least one ethylenically unsaturated monomer including an epoxy group in the presence of a suitable catalyst.

14. The adhesive compositions of claim 13 wherein the carboxylic acid functionalized monomers are selected from the group consisting of acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate, acryloxyethyl acid phthalate, and combinations thereof.

15. The adhesive composition of claim 13 wherein the ethylenically unsaturated monomer including an epoxy group is selected from the group consisting of glycidyl methacrylate, glycidyl acrylate, acrylated epoxidized soybean oil, allyl glycidyl ether, 3,4-epoxycyclohexyl methyl methacrylate, and combinations thereof.

16. The adhesive composition of claim 13 wherein the catalyst is selected from the group consisting of tetrabutyl ammonium hydroxide, methyl tributyl ammonium hydroxide, ammonium hydroxide, tetrabutyl ammonium chloride, methyltributyl ammonium chloride, triphenyl phosphine, chromium acetate, and combinations thereof.

17. The adhesive composition of claim 12 further comprising:
an ultraviolet photoinitiator.

18. The adhesive composition of claim 12 wherein upon sufficient exposure to radiant energy, the adhesive undergoes a reduction in tack of at least 30% as compared to its initial tack prior to the exposure.

19. The adhesive composition of claim 18 wherein the adhesive undergoes a reduction in tack of at least 50%.

20. A method for selectively reducing tack of an adhesive within a layered assembly, the method comprising:
providing a layered assembly including (i) a face layer, (ii) a release layer, and (iii) a layer of adhesive disposed between the face layer and the release layer, the adhesive having a characteristic such that upon sufficient exposure to radiant energy, the exposed adhesive undergoes a reduction in tack, wherein at least one of the face layer and the release layer is substantially transparent to the radiant energy;
irradiating the layered assembly with the radiant energy such that the radiant energy passes through at least one of the face layer and the release layer to the adhesive layer, whereby the irradiated adhesive undergoes a reduction in tack.

21. The method of claim 20 further comprising:
positioning a mask between a source of the radiant energy and the layered assembly, the mask defining at least one passage region which permits the radiant energy to pass therethrough to the layered assembly.

22. The method of claim 20 wherein the radiant energy is UV light.

23. The method of claim 22 wherein the adhesive includes at least one ultraviolet photoinitiator.

24. The method of claim 20 wherein the radiant energy is ebeam energy.

25. The method of claim 20 wherein the irradiating is performed such that the tack of the adhesive after the irradiation is reduced by at least 30% as compared to its initial tack prior to the irradiation.

26. The method of claim 25 wherein the irradiating is performed such that the tack of the adhesive after the irradiation is reduced by at least 50% as compared to its initial tack prior to the irradiation.

27. The method of claim 20 wherein the adhesive comprises an effective amount of functionalized emulsion polymer.

28. The method of claim 27 wherein the functionalized emulsion polymer is prepared by treating an emulsion polymer having carboxylic acid functional monomers with at least one ethylenically unsaturated monomer including an epoxy group in the presence of a suitable catalyst.

29. The method of claim 28 wherein the carboxylic acid functionalized monomers are selected from the group consisting of acrylic acid, methacrylic acid, itaconic acid, citraconic acid, acryloxypropionic acid, maleic acid, methacryloxyisopropyl acid phthalate, methacryloxyethyl acid phthalate, acryloxyisopropyl acid phthalate, acryloxyethyl acid phthalate, and combinations thereof.

30. The method of any claim 28 wherein the ethylenically unsaturated monomer including an epoxy group is selected from the group consisting of glycidyl methacrylate, glycidyl acrylate, acrylated epoxidized soybean oil, allyl glycidyl ether, 3,4-epoxycyclohexyl methyl methacrylate, and combinations thereof.

31. The method of claim 28 wherein the catalyst is selected from the group consisting of tetrabutyl ammonium hydroxide, methyl tributyl ammonium hydroxide, ammonium hydroxide, tetrabutyl ammonium chloride, methyltributyl ammonium chloride, triphenyl phosphine, chromium acetate, and combinations thereof.

* * * * *